US009336701B2

(12) United States Patent
Hwang

(10) Patent No.: US 9,336,701 B2
(45) Date of Patent: May 10, 2016

(54) METHOD OF DRIVING A PIXEL CIRCUIT

(71) Applicant: SAMSUNG DISPLAY CO., LTD., Yongin, Gyeonggi-Do (KR)

(72) Inventor: Young-In Hwang, Yongin (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 0 days.

(21) Appl. No.: 14/602,618

(22) Filed: Jan. 22, 2015

(65) Prior Publication Data

US 2015/0138181 A1    May 21, 2015

Related U.S. Application Data

(62) Division of application No. 13/593,043, filed on Aug. 23, 2012, now Pat. No. 8,947,331.

(30) Foreign Application Priority Data

Mar. 23, 2012  (KR) .................. 10-2012-0029639

(51) Int. Cl.
*G09G 3/00* (2006.01)
*G09G 3/32* (2016.01)
*H04N 13/04* (2006.01)

(52) U.S. Cl.
CPC .............. *G09G 3/003* (2013.01); *G09G 3/3233* (2013.01); *H04N 13/0438* (2013.01);
(Continued)

(58) Field of Classification Search
CPC ................ G09G 3/003; G09G 3/3233; G09G 2300/0819; G09G 2300/0852; G09G 2300/0866; G09G 2310/0202; G09G 2310/0216; G09G 2310/0251; G09G 2310/0262; G09G 2310/063; G09G 2330/00; H04N 13/0438; H04N 13/0486; H04N 13/0497

USPC ............. 345/76–83, 204–214, 690–699, 6–9; 315/169.3
See application file for complete search history.

(56) References Cited

U.S. PATENT DOCUMENTS 7,825,881 B2   11/2010  Shin
7,911,427 B2    3/2011  Chung et al.
(Continued)

FOREIGN PATENT DOCUMENTS

JP      2004341349     12/2004
JP       200653539      2/2006
(Continued)

OTHER PUBLICATIONS

Office Action from corresponding EP Application 12189157.6—Feb. 1, 2013.
(Continued)

*Primary Examiner* — Dmitriy Bolotin
(74) *Attorney, Agent, or Firm* — Lee & Morse, P.C.

(57) ABSTRACT

A pixel circuit includes an organic light emitting diode, a first PMOS transistor coupled between a first power voltage and an anode electrode of the organic light emitting diode, a second PMOS transistor coupled between a first node and the anode electrode of the organic light emitting diode, a first capacitor coupled between a second node and the first node, a second capacitor coupled between the first power voltage and the second node, a third PMOS transistor coupled between a data line and the second node, a fourth PMOS transistor coupled between a third node and the second node, a third capacitor coupled between the third node and a gate terminal of the third PMOS transistor, and a fifth PMOS transistor coupled between the data line and the third node.

4 Claims, 22 Drawing Sheets

(52) U.S. Cl.
CPC ...... *H04N 13/0486* (2013.01); *H04N 13/0497* (2013.01); *G09G 2300/0819* (2013.01); *G09G 2300/0852* (2013.01); *G09G 2300/0866* (2013.01); *G09G 2310/0202* (2013.01); *G09G 2310/0216* (2013.01); *G09G 2310/0251* (2013.01); *G09G 2310/0262* (2013.01); *G09G 2310/063* (2013.01); *G09G 2330/00* (2013.01)

(56) References Cited

U.S. PATENT DOCUMENTS

| | | | |
|---|---|---|---|
| 7,944,412 | B2 | 5/2011 | Ikeda |
| 7,944,418 | B2 | 5/2011 | Chung et al. |
| 8,049,701 | B2 | 11/2011 | Kim |
| 2002/0130828 | A1* | 9/2002 | Yamazaki et al. ............ 345/80 |
| 2006/0097966 | A1 | 5/2006 | Choi |
| 2006/0132055 | A1 | 6/2006 | Kwak |
| 2007/0024540 | A1 | 2/2007 | Ryu et al. |
| 2007/0024541 | A1 | 2/2007 | Ryu et al. |
| 2007/0024542 | A1 | 2/2007 | Chung et al. |
| 2007/0024543 | A1 | 2/2007 | Chung et al. |
| 2007/0085781 | A1 | 4/2007 | Chung et al. |
| 2009/0167648 | A1 | 7/2009 | Jeon et al. |
| 2010/0201656 | A1 | 8/2010 | Han et al. |
| 2011/0025671 | A1 | 2/2011 | Lee |
| 2012/0007848 | A1 | 1/2012 | Han et al. |
| 2012/0026147 | A1 | 2/2012 | Komiya |
| 2012/0038605 | A1 | 2/2012 | Han |
| 2012/0113077 | A1 | 5/2012 | Kang |
| 2012/0320016 | A1 | 12/2012 | Hirata |
| 2014/0176520 | A1 | 6/2014 | Hwang |
| 2014/0192037 | A1 | 7/2014 | Chung |
| 2014/0198085 | A1 | 7/2014 | Park et al. |

FOREIGN PATENT DOCUMENTS

| | | |
|---|---|---|
| KR | 10-2011-0013693 A | 2/2011 |
| KR | 10-2012-0048294 A | 5/2012 |
| WO | WO 2011/077718 A1 | 6/2011 |
| WO | 2011104965 | 9/2011 |

OTHER PUBLICATIONS

Japanese Office Action dated Mar. 10, 2016.

* cited by examiner

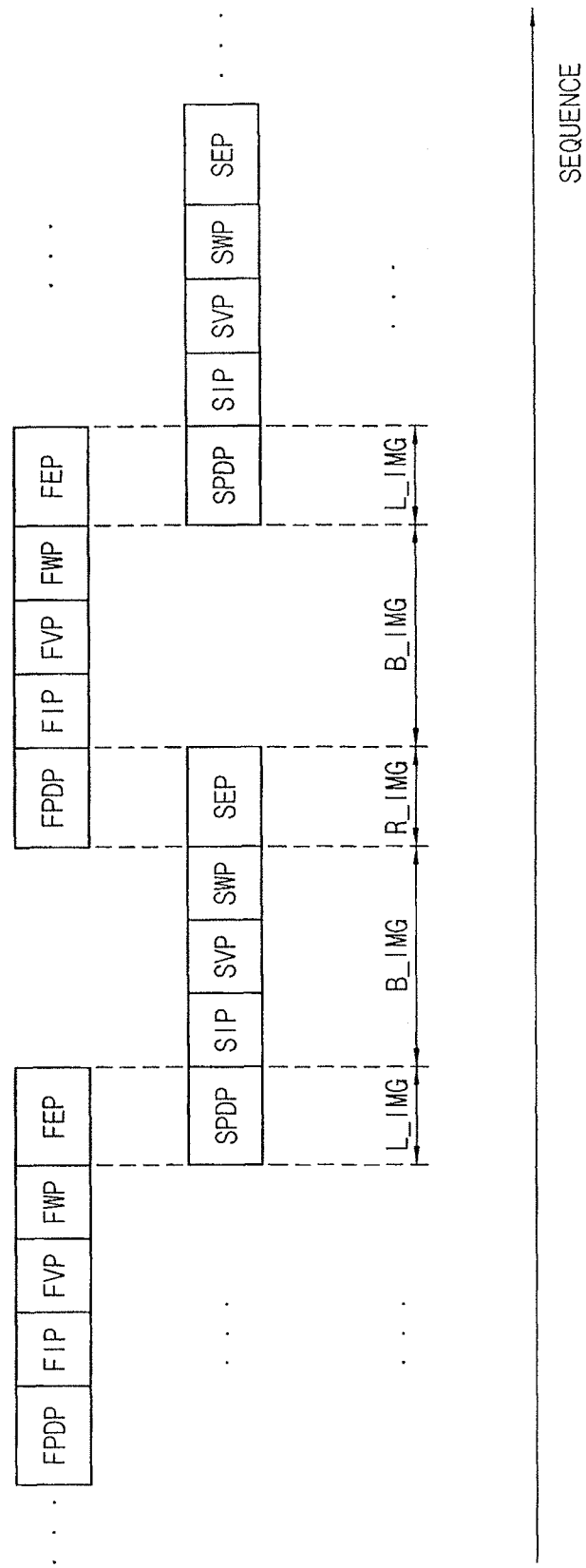

METHOD OF DRIVING A PIXEL CIRCUIT

CROSS-REFERENCE TO RELATED APPLICATIONS

This is a divisional application based on pending application Ser. No. 13/593,043, filed Aug. 23, 2012, the entire contents of which is hereby incorporated by reference.

This application claims priority under 35 U.S.C. §119 to Korean Patent Application No. 10-2012-0029639, filed on Mar. 23, 2012, in the Korean Intellectual Property Office and entitled, "Pixel Circuit, Method of Driving a Pixel Circuit, and Organic Light Emitting Display Device," the entire contents of which are hereby incorporated by reference for all purposes.

BACKGROUND

1. Technical Field

Embodiments relate to a pixel circuit, a method of driving the pixel circuit, and an organic light emitting display device.

2. Description of the Related Art

In a stereoscopic (3D) image display technique, a stereoscopic image may be implemented using binocular parallax that provides a three-dimensional effect. Generally, a stereoscopic image may be implemented by alternately providing a left image and a right image to a left eye and a right eye, respectively. It may be desirable to use an organic light emitting display device, which may provide fast response speed and low power consumption, as a flat panel display device for displaying a stereoscopic image.

SUMMARY

Embodiments are directed to a pixel circuit, including an organic light emitting diode, a cathode electrode of the organic light emitting diode being coupled to a second power voltage, a first PMOS transistor coupled between a first power voltage and an anode electrode of the organic light emitting diode, a gate terminal of the first PMOS transistor being coupled to a first node, a second PMOS transistor coupled between the first node and the anode electrode of the organic light emitting diode, a gate terminal of the second PMOS transistor receiving a compensation control signal, a first capacitor coupled between a second node and the first node, a second capacitor coupled between the first power voltage and the second node, a third PMOS transistor coupled between a data line and the second node, a gate terminal of the third PMOS transistor receiving the compensation control signal, a fourth PMOS transistor coupled between a third node and the second node, a gate terminal of the fourth PMOS transistor receiving an emission control signal, a third capacitor coupled between the third node and the gate terminal of the third PMOS transistor, and a fifth PMOS transistor coupled between the data line and the third node, a gate terminal of the fifth PMOS transistor being coupled to a scan line.

The circuit may be configured to alternately perform a first display operation for displaying a left image and a second display operation for displaying a right image, the first display operation and the second display operation being performed based on a simultaneous emission method.

The first display operation may include a first preliminary data writing operation, a first reset operation, a first threshold voltage compensation operation, a first data writing operation, and a first emission operation, and the second display operation may include a second preliminary data writing operation, a second reset operation, a second threshold voltage compensation operation, a second data writing operation, and a second emission operation.

The circuit may be configured to simultaneously perform the first emission operation and the second preliminary data writing operation, and may be configured to simultaneously perform the second emission operation and the first preliminary data writing operation.

While the first preliminary data writing operation is performed, the fourth PMOS transistor may turn off, and a first image data that is applied through the data line may be stored in the third capacitor when the fifth PMOS transistor turns on in response to a scan signal that is applied through the scan line, and, while the second preliminary data writing operation is performed, the fourth PMOS transistor may turn off, and a second image data that is applied through the data line may be stored in the third capacitor when the fifth PMOS transistor turns on in response to the scan signal that is applied through the scan line.

While the first reset operation is performed, the second through fourth PMOS transistors may turn off, the second power voltage may have a high voltage level, and the first power voltage may have a low voltage level, and, while the second reset operation is performed, the second through fourth PMOS transistors may turn off, the second power voltage may have a high voltage level, and the first power voltage may have a low voltage level.

While the first threshold voltage compensation operation is performed, the fourth PMOS transistor may turn off, the second and third PMOS transistors may turn on, the second power voltage may have a high voltage level, and the first power voltage may have a high voltage level, and, while the second threshold voltage compensation operation is performed, the fourth PMOS transistor may turn off, the second and third PMOS transistors may turn on, the second power voltage may have a high voltage level, and the first power voltage may have a high voltage level.

While the first data writing operation is performed, the fourth PMOS transistor may turn on, the second and third PMOS transistors may turn off, the second power voltage may have a high voltage level, and the first power voltage may have a high voltage level, and, while the second data writing operation is performed, the fourth PMOS transistor may turn on, the second and third PMOS transistors may turn off, the second power voltage may have a high voltage level, and the first power voltage may have a high voltage level.

While the first emission operation is performed, the second through fourth PMOS transistors may turn off, the second power voltage may have a low voltage level, and the first power voltage may have a high voltage level, and, while the second emission operation is performed, the second through fourth PMOS transistors may turn off, the second power voltage may have a low voltage level, and the first power voltage may have a high voltage level.

The first display operation may further include a first off-bias applying operation, and the second display operation may further include a second off-bias applying operation.

While the first off-bias applying operation is performed, the fourth PMOS transistor may turn off, the second and third PMOS transistors may turn on, the second power voltage may have a high voltage level, and the first power voltage may have a low voltage level, and, while the second off-bias applying operation is performed, the fourth PMOS transistor may turn off, the second and third PMOS transistors may turn on, the second power voltage may have a high voltage level, and the first power voltage may have a low voltage level.

The circuit may further include a fourth capacitor coupled between the anode electrode and the cathode electrode of the organic light emitting diode.

Embodiments are also directed to a pixel circuit, including an organic light emitting diode, a cathode electrode of the organic light emitting diode being coupled to a second power voltage, a first PMOS transistor coupled between a first power voltage and an anode electrode of the organic light emitting diode, a gate terminal of the first PMOS transistor being coupled to a first node, a second PMOS transistor coupled between the first node and the anode electrode of the organic light emitting diode, a gate terminal of the second PMOS transistor receiving a compensation control signal, a first capacitor coupled between a second node and the first node, a second capacitor coupled between the first power voltage and the second node, a third PMOS transistor coupled between a data line and the second node, a gate terminal of the third PMOS transistor receiving the compensation control signal, a fourth PMOS transistor coupled between a third node and the second node, a gate terminal of the fourth PMOS transistor receiving an emission control signal, a third capacitor coupled between the third node and a sustain power voltage, and a fifth PMOS transistor coupled between the data line and the third node, a gate terminal of the fifth PMOS transistor being coupled to a scan line.

The circuit may be configured to alternately perform a first display operation for displaying a left image and a second display operation for displaying a right image, the first display operation and the second display operation being performed based on a simultaneous emission method.

The first display operation may include a first preliminary data writing operation, a first reset operation, a first threshold voltage compensation operation, a first data writing operation, and a first emission operation, and the second display operation may include a second preliminary data writing operation, a second reset operation, a second threshold voltage compensation operation, a second data writing operation, and a second emission operation.

The circuit may be configured to simultaneously perform the first emission operation and the second preliminary data writing operation, and may be configured to simultaneously perform the second emission operation and the first preliminary data writing operation.

The first display operation may further include a first off-bias applying operation, and the second display operation may further include a second off-bias applying operation.

The circuit may further include a fourth capacitor coupled between the anode electrode and the cathode electrode of the organic light emitting diode.

Embodiments are also directed to a pixel circuit, including an organic light emitting diode, an anode electrode of the organic light emitting diode being coupled to a first power voltage, a first NMOS transistor coupled between a second power voltage and a cathode electrode of the organic light emitting diode, a gate terminal of the first NMOS transistor being coupled to a first node, a second NMOS transistor coupled between the first node and the cathode electrode of the organic light emitting diode, a gate terminal of the second NMOS transistor receiving a compensation control signal, a first capacitor coupled between a second node and the first node, a second capacitor coupled between the second power voltage and the second node, a third NMOS transistor coupled between a data line and the second node, a gate terminal of the third NMOS transistor receiving the compensation control signal, a fourth NMOS transistor coupled between a third node and the second node, a gate terminal of the fourth NMOS transistor receiving an emission control signal, a third capacitor coupled between the third node and the gate terminal of the third NMOS transistor, and a fifth NMOS transistor coupled between the data line and the third node, a gate terminal of the fifth NMOS transistor being coupled to a scan line.

Embodiments are also directed to a pixel circuit, including an organic light emitting diode, an anode electrode of the organic light emitting diode being coupled to a first power voltage, a first NMOS transistor coupled between a second power voltage and a cathode electrode of the organic light emitting diode, a gate terminal of the first NMOS transistor being coupled to a first node, a second NMOS transistor coupled between the first node and the cathode electrode of the organic light emitting diode, a gate terminal of the second NMOS transistor receiving a compensation control signal, a first capacitor coupled between a second node and the first node, a second capacitor coupled between the second power voltage and the second node, a third NMOS transistor coupled between a data line and the second node, a gate terminal of the third NMOS transistor receiving the compensation control signal, a fourth NMOS transistor coupled between a third node and the second node, a gate terminal of the fourth NMOS transistor receiving an emission control signal, a third capacitor coupled between the third node and a sustain power voltage, and a fifth NMOS transistor coupled between the data line and the third node, a gate terminal of the fifth NMOS transistor being coupled to a scan line.

Embodiments are also directed to an organic light emitting display device, including a pixel unit having a plurality of pixel circuits, each pixel circuit of the plurality of pixel circuits being the pixel circuit according to an embodiment, a scan driving unit configured to provide a scan signal to the pixel circuits, a data driving unit configured to provide a data signal to the pixel circuits, a control signal generating unit configured to provide the emission control signal and the compensation control signal to the pixel circuits, a power unit configured to provide the first power voltage and the second power voltage to the pixel units, and a timing control unit configured to control the scan driving unit, the data driving unit, the control signal generating unit, and the power unit.

Each pixel circuit of the plurality of pixel circuits may be configured to alternately perform a first display operation for displaying a left image and a second display operation for displaying a right image, the first display operation and the second display operation being performed based on a simultaneous emission method.

The first display operation may include a first preliminary data writing operation, a first reset operation, a first threshold voltage compensation operation, a first data writing operation, and a first emission operation, the second display operation may include a second preliminary data writing operation, a second reset operation, a second threshold voltage compensation operation, a second data writing operation, and a second emission operation, and each pixel circuit of the plurality of pixel circuits may be configured to simultaneously perform the first emission operation and the second preliminary data writing operation, and may be configured to simultaneously perform the second emission operation and the first preliminary data writing operation.

The first display operation may further include a first off-bias applying operation, and the second display operation may further include a second off-bias applying operation.

Embodiments are also directed to an organic light emitting display device, including a pixel unit having a plurality of pixel circuits, each pixel circuit of the plurality of pixel circuits being the pixel circuit according to another embodiment, a scan driving unit configured to provide a scan signal to the pixel circuits, a data driving unit configured to provide a data signal to the pixel circuits, a control signal generating unit configured to provide the emission control signal and the compensation control signal to the pixel circuits, a power unit configured to provide the first power voltage, the second power voltage, and the sustain power voltage to the pixel units, and a timing control unit configured to control the scan driving unit, the data driving unit, the control signal generating unit, and the power unit.

Each pixel circuit of the plurality of pixel circuits may be configured to alternately perform a first display operation for displaying a left image and a second display operation for displaying a right image, the first display operation and the second display operation being performed based on a simultaneous emission method.

The first display operation may include a first preliminary data writing operation, a first reset operation, a first threshold voltage compensation operation, a first data writing operation, and a first emission operation, the second display operation may include a second preliminary data writing operation, a second reset operation, a second threshold voltage compensation operation, a second data writing operation, and a second emission operation, and each pixel circuit of the plurality of pixel circuits may be configured to simultaneously perform the first emission operation and the second preliminary data writing operation, and may be configured to simultaneously perform the second emission operation and the first preliminary data writing operation.

The first display operation may further include a first off-bias applying operation, and the second display operation may further include a second off-bias applying operation.

Embodiments are also directed to a method of driving a pixel circuit, including simultaneously performing a first emission operation of a first display operation for displaying a left image and a second preliminary data writing operation of a second display operation for displaying a right image, sequentially performing a second reset operation, a second threshold voltage compensation operation, and a second data writing operation of the second display operation after the first emission operation is completed, simultaneously performing a second emission operation of the second display operation and a first preliminary data writing operation of the first display operation, and sequentially performing a first reset operation, a first threshold voltage compensation operation, and a first data writing operation of the first display operation after the second emission operation is completed.

The method may further include performing a first off-bias applying operation of the first display operation prior to the first reset operation of the first display operation, and performing a second off-bias applying operation of the second display operation prior to the second reset operation of the second display operation.

BRIEF DESCRIPTION OF THE DRAWINGS

Features will become apparent to those of skill in the art by describing in detail exemplary embodiments with reference to the attached drawings in which;

FIG. 3 illustrates a diagram of an example in which a stereoscopic image is implemented by an organic light emitting display device having the pixel circuit of FIG. 1.

DETAILED DESCRIPTION

Figure 1:
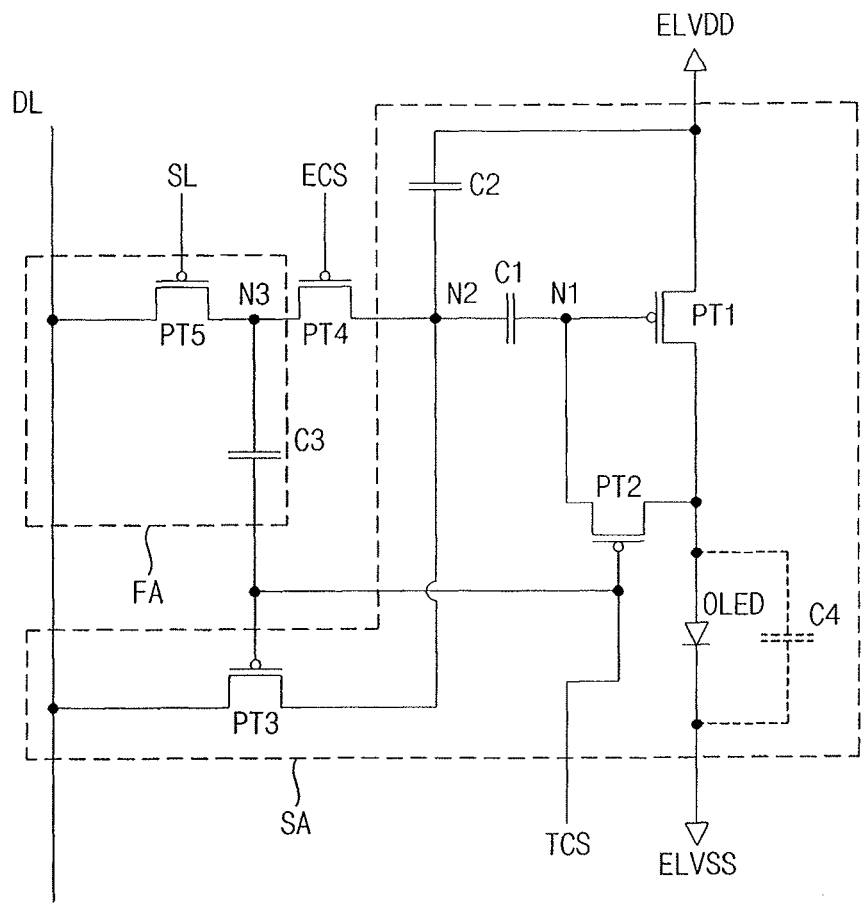
FIG. 1 illustrates a circuit diagram of a pixel circuit according to example embodiments.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. Like reference numerals refer to like elements throughout.

It will be understood that, although the terms first, second, third, etc., may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 illustrates a circuit diagram of a pixel circuit according to example embodiments.

Referring to FIG. 1, the pixel circuit 100 may include an organic light emitting diode OLED, first through fifth p-channel metal oxide semiconductor (PMOS) transistors PT1 through PT5, and first through third capacitors C1 through C3. The pixel circuit 100 may have a 5T-3C structure (i.e., a structure having five transistors and three capacitors). In an example embodiment, the pixel circuit 100 may further include a fourth capacitor C4 coupled between an anode electrode and a cathode electrode of the organic light emitting diode OLED. The fourth capacitor C4 may be an auxiliary capacitor.

The organic light emitting diode OLED may be coupled between a second power voltage ELVSS and the first PMOS transistor PT1. In detail, a cathode electrode of the organic light emitting diode OLED may be coupled to the second power voltage ELVSS, and an anode electrode of the organic light emitting diode OLED may be coupled to a first terminal of the first PMOS transistor PT1. The organic light emitting diode OLED may emit light based on a current that is controlled by the first PMOS transistor PT1. The first PMOS transistor PT1 may be coupled between a first power voltage ELVDD and the anode electrode of the organic light emitting diode OLED. A gate terminal of the first PMOS transistor PT1 may be coupled to a first node N1. The first PMOS transistor PT1 may be a driving transistor that controls a current flowing through the organic light emitting diode OLED. As illustrated in FIG. 1, the first node N1 is a node at which a first terminal of the first capacitor C1, a first terminal of the second PMOS transistor PT2, and the gate terminal of the first PMOS transistor PT1 are coupled to each other. The second PMOS transistor PT2 may be coupled between the first node N1 and the anode electrode of the organic light emitting diode OLED. A gate terminal of the second PMOS transistor PT2 may receive a compensation control signal TCS. In detail, the first terminal of the second PMOS transistor PT2 may be coupled to the first node N1, and a second terminal of the second PMOS transistor PT2 may be coupled to the first terminal of the first PMOS transistor PT1. Thus, when the second PMOS transistor PT2 turns on in response to the compensation control signal TCS, the first PMOS transistor PT1 may be diode-coupled.

The first capacitor C1 may be coupled between the first node N1 and a second node N2. In detail, the first terminal of the first capacitor C1 may be coupled to the first node N1, and a second terminal of the first capacitor C1 may be coupled to the second node N2. The first capacitor C1 may be a threshold voltage compensation capacitor. As illustrated in FIG. 1, the second node N2 is a node at which a second terminal of the first capacitor C1, a first terminal of the second capacitor C2, a first terminal of the third PMOS transistor PT3, and a first terminal of the fourth PMOS transistor PT4 are coupled to each other. The second capacitor C2 may be coupled between the first power voltage ELVDD and the second node N2. The second capacitor C2 may be a storage capacitor. In detail, the first terminal of the second capacitor C2 may be coupled to the second node N2, and a second terminal of the second capacitor C2 may be coupled to the first power voltage ELVDD. The third PMOS transistor PT3 may be coupled between a data line DL and the second node N2. A gate terminal of the third PMOS transistor PT3 may receive the compensation control signal TCS. In detail, the first terminal of the third PMOS transistor PT3 may be coupled to the second node N2, a second terminal of the third PMOS transistor PT3 may be coupled to the data line DL, and the gate terminal of the third PMOS transistor PT3 may be coupled to the gate terminal of the second PMOS transistor PT2. The fourth PMOS transistor PT4 may be coupled between a third node N3 and the second node N2. A gate terminal of the fourth PMOS transistor PT4 may receive an emission control signal ECS. In detail, the first terminal of the fourth PMOS transistor PT4 may be coupled to the second node N2, and a second terminal of the fourth PMOS transistor PT4 may be coupled to the third node N3. As illustrated in FIG. 1, the third node N3 is a node at which the second terminal of the fourth PMOS transistor PT4, a first terminal of the fifth PMOS transistor PT5, and a first terminal of the third capacitor C3 are coupled to each other.

The third capacitor C3 may be coupled between the third node N3 and the gate terminal of the third PMOS transistor PT3. In detail, the first terminal of the third capacitor C3 may be coupled to the third node N3, and a second terminal of the third capacitor C3 may be coupled to the gate terminal of the third PMOS transistor PT3. The fifth PMOS transistor PT5 may be coupled between the data line DL and the third node N3. A gate terminal of the fifth PMOS transistor PT5 may be coupled to a scan line SL. In detail, the first terminal of the fifth PMOS transistor PT5 may be coupled to the third node N3, a second terminal of the fifth PMOS transistor PT5 may be coupled to the data line DL, and the gate terminal of the fifth PMOS transistor PT5 may be coupled to the scan line SL. The data line DL may be coupled to a data driving unit of an organic light emitting display device to provide a data signal (e.g., left image data or right image data). In addition, the scan line SL may be coupled to a scan driving unit of the organic light emitting display device to provide a scan signal. As described above, the pixel circuit 100 may have a 5T-3C structure that includes the organic light emitting diode OLED, the first through fifth PMOS transistors PT1 through PT5, and the first through third capacitors C1 through C3. An organic light emitting display device having the pixel circuit 100 may implement a stereoscopic image by alternately displaying a left image and a right image based on a simultaneous emission method. For example, the right image data may be sequentially written into each pixel circuit 100 of the organic light emitting display device while the left image is simultaneously displayed by each pixel circuit 100 of the organic light emitting display device. Similarly, the left image data may be sequentially written into each pixel circuit 100 of the organic light emitting display device while the right image is simultaneously displayed by each pixel circuit 100 of the organic light emitting display device.

As illustrated in FIG. 1, the pixel circuit 100 may include a first region FA and a second region SA. In the following description, the first region FA includes the third capacitor C3 and the fifth PMOS transistor PT5, and the second region SA includes the first and second capacitors C1 and C2 and the first through fourth PMOS transistors PT1 through PT4. When the fourth PMOS transistor PT4 turns on, the first region FA may be coupled to the second region SA. When the fourth PMOS transistor PT4 turns off, the first region FA may be separated from the second region SA. In detail, when the fourth PMOS transistor PT4 turns on, the first region FA may be coupled to the second region SA in the pixel circuit 100. As a result, a data signal (e.g., the left image data or the right image data) stored in the third capacitor C3 may be transferred to the second region SA. On the other hand, when the fourth PMOS transistor PT4 turns off, the first region FA may be separated from the second region SA in the pixel circuit 100. As a result, the first region FA and the second region SA may perform respective operations. In detail, an emission operation may be performed in the second region SA while a preliminary data writing operation is performed in the first region FA. Thus, an operation of the first region FA may be independent from an operation of the second region SA. For example, when the fourth PMOS transistor PT4 turns off in response to the emission control signal ECS, the first image (e.g., the left image or the right image) may be displayed by the first and second PMOS transistors PT1 and PT2, the first and second capacitors C1 and C2, and the organic light emitting diode OLED (i.e., an operation of the second region SA). At the same time, the second image data (e.g., the right image data or the left image data) input through the data line DL may be stored in the third capacitor C3 when the fifth PMOS transistor PT5 turns on in response to a scan signal input through the scan line SL (i.e., an operation of the first region FA). Hereinafter, an operation of the pixel circuit 100 will be described in detail.

Figure 2:
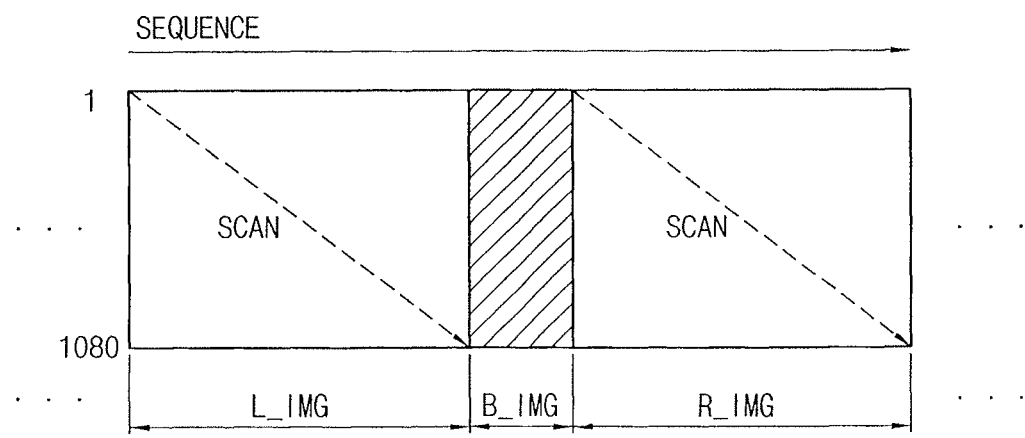
FIG. 2 illustrates a diagram of an example in which an organic light emitting display device implements a stereoscopic image based on a simultaneous emission method.

FIG. 2 illustrates a diagram of an example in which an organic light emitting display device implements a stereoscopic image based on a simultaneous emission method.

FIG. 2 shows how a stereoscopic image is implemented by alternately displaying a left image L_IMG and a right image R_IMG based on a simultaneous emission method. In detail, a stereoscopic image may be implemented by providing the left image L_IMG and the right image R_IMG to a left eye and a right eye, respectively. For example, in case of a shutter glasses method, a stereoscopic image may be implemented by opening a left shutter of shutter glasses while the left image L_IMG is displayed, and by opening a right shutter of shutter glasses while the right image R_IMG is displayed. Here, these operations may be performed (i.e., repeated) very fast to prevent a viewer from noticing a timing difference between the operations. The viewer sees a stereoscopic image by sequentially watching the left image L_IMG and the right image R_IMG.

By comparison, for a sequential emission method, a black image B_IMG is inserted between a left image L_IMG and a right image R_IMG when sequentially displaying the left image L_IMG and the right image R_IMG. The black image B_IMG is inserted to separate the right image R_IMG from the left image L_IMG. As a result, due to the black image B_IMG, a luminance may be decreased and power consumption may be increased.

As illustrated in FIG. 2, an organic light emitting display device having the pixel circuit 100 of FIG. 1 according to an embodiment may display the left image L_IMG and the right image R_IMG based on a simultaneous emission method. As a result, a time in which the black image B_IMG is displayed between the left image L_IMG and the right image R_IMG may be reduced or eliminated. In addition, the pixel circuit 100 of FIG. 1 has a structure in which the first region FA and the second region SA may be separated from each other by the fourth PMOS transistor PT4. Thus, the organic light emitting display device having the pixel circuit 100 of FIG. 1 may write right image data into the pixel circuit 100 of FIG. 1 while performing an emission operation of the left image L_IMG, and may write left image data into the pixel circuit of FIG. 1 while performing an emission operation of the right image R_IMG. As a result, the organic light emitting display device having the pixel circuit 100 of FIG. 1 may operate at a high speed, which may thus allow an operating frequency of the organic light emitting display device having the pixel circuit 100 of FIG. 1 to be reduced.

As described above, embodiments may provide an improvement in luminance by reducing or eliminating a time in which the black image B_IMG is displayed in the organic light emitting display device having the pixel circuit 100 of FIG. 1. In addition, the right image data may be stored while an emission operation of the left image L_IMG is performed, and left image data may be stored when an emission operation of the right image R_IMG is performed, and thus an operating speed may be improved in the organic light emitting display device having the pixel circuit 100 of FIG. 1.

A general organic light emitting display device that sequentially repeats (i.e., displays) the left image L_IMG of 60 Hz, the black image B_IMG of 60 Hz, the right image R_IMG of 60 Hz, and the black image B_IMG of 60 Hz may use an operating speed of 240 Hz to implement a stereoscopic image. By comparison, the organic light emitting display device having the pixel circuit 100 of FIG. 1 may sequentially repeat (i.e., displays) the left image L_IMG of 60 Hz and the right image R_IMG of 60 Hz, and may use an operating speed of 120 Hz to implement a stereoscopic image. Further, the organic light emitting display device having the pixel circuit 100 of FIG. 1 may obtain a data charging time two times longer than the general organic light emitting display device, may increase a lifetime (e.g., by reducing a peak current by half), and may reduce power consumption by half (e.g., by improving luminance).

The pixel circuit 100 of FIG. 1 may sequentially perform a preliminary data writing operation, a reset operation, a threshold voltage compensation operation, a data writing operation, and an emission operation to display the left image L_IMG or the right image R_IMG (i.e., one frame) based on a simultaneous emission method. The preliminary data writing operation may be sequentially performed (by each scan line) for all pixel circuits 100 of the organic light emitting display device, whereas the reset operation, the threshold voltage compensation operation, the data writing operation, and/or the emission operation may be simultaneously performed for all pixel circuits 100 of the organic light emitting display device.

FIG. 3 illustrates a diagram of an example in which a stereoscopic image is implemented by an organic light emitting display device having the pixel circuit of FIG. 1.

FIG. 3 shows how a stereoscopic image is implemented by alternately performing a first display operation for displaying a first image (e.g., a left image L_IMG) and a second display operation for displaying a second image (e.g., a right image R_IMG). The first display operation and the second display operation may be performed in the pixel circuit 100 of FIG. 1 based on a simultaneous emission method.

The first display operation for displaying the first image L_IMG may include a first preliminary data writing operation FPDP, a first reset operation FIP, a first threshold voltage compensation operation FVP, a first data writing operation FWP, and a first emission operation FEP. The second display operation for displaying the second image R_IMG may include a second preliminary data writing operation SPDP, a second reset operation SIP, a second threshold voltage compensation operation SVP, a second data writing operation SWP, and a second emission operation SEP. The first emission operation FEP of the first display operation and the second preliminary data writing operation SPDP of the second display operation may be simultaneously performed in the pixel circuit 100 of FIG. 1. Similarly, the second emission operation SEP of the second display operation and the first preliminary data writing operation FPDP of the first display operation may be simultaneously performed in the pixel circuit 100 of FIG. 1. Thus, the first emission operation FEP of the first display operation may overlap the second preliminary data writing operation SPDP of the second display operation, and the second emission operation SEP of the second display operation may overlap the first preliminary data writing operation FPDP of the first display operation.

As illustrated in FIG. 3, a viewer may sequentially and repeatedly watch the left image L_IMG, the black image B_IMG, the right image R_IMG, and the black image B_IMG. Here, since these operations may be performed (i.e., repeated) very fast so that the viewer does not notice a timing difference between these operations. The viewer may see a stereoscopic image by sequentially and repeatedly watching the left image L_IMG, the black image B_IMG, the right image R_IMG, and the black image B_IMG. For convenience of descriptions, it is illustrated in FIG. 3 that a time in which the black image B_IMG is displayed is relatively long. However, a time in which the black image B_IMG is displayed may in practice be much shorter than a time in which the left image L_IMG is displayed and a time in which the right image R_IMG is displayed because the first display operation for displaying the left image L_IMG and the second display operation for displaying the right image R_IMG may be performed based on a simultaneous emission method. As a result, the organic light emitting display device having the pixel circuit 100 of FIG. 1 may improve luminance and may reduce an operating frequency. Hereinafter, an operation of the pixel circuit 100 of FIG. 1 will be described in detail with reference to FIGS. 4A through 4E.

FIGS. 4A through 4E illustrate timing diagrams of an example operation of the pixel circuit of FIG. 1.

A first display operation for displaying a first image (e.g., a left image) may include a first preliminary data writing operation FPDP, a first reset operation FIP, a first threshold voltage compensation operation FVP, a first data writing operation FWP, and a first emission operation FEP. Similarly, a second display operation for displaying a second image (e.g., a right image) may include a second preliminary data writing operation SPDP, a second reset operation SIP, a second threshold voltage compensation operation SVP, a second data writing operation SWP, and a second emission operation SEP.

For convenience of description, FIGS. 4A through 4E, focus on the first display operation for displaying the first image.

Referring to FIGS. 4A-4E, the first preliminary data writing operation FPDP, the first reset operation FIP, the first threshold voltage compensation operation FVP, the first data writing operation FWP, and the first emission operation FEP of the first display operation may respectively correspond to a first preliminary data writing period PA, a first reset period PB, a first threshold voltage compensation period PC, a first data writing period PD, and a first emission period PE (similarly, the second preliminary data writing operation SPDP, the second reset operation SIP, the second threshold voltage compensation operation SVP, the second data writing operation SWP, and the second emission operation SEP may respectively correspond to a second preliminary data writing period PA, a second reset period PB, a second threshold voltage compensation period PC, a second data writing period PD, and a second emission period PE). The first display operation and the second display operation may be separated in time. Thus, the present inventive concept may be applied to a stereoscopic image display system employing a shutter glasses method, a stereoscopic image display system employing a parallax barrier method, etc.

The preliminary data writing operation (i.e., the first preliminary data writing operation FPDP or the second preliminary data writing operation SPDP) may be sequentially performed for all pixel circuits 100 of the organic light emitting display device by each scan line SL, whereas the reset operation (i.e., the first reset operation FIP or the second reset operation SIP), the threshold voltage compensation operation (i.e., the first threshold voltage compensation operation FVP or the second threshold voltage compensation operation SVP), the data writing operation (i.e., the first data writing operation FWP or the second data writing operation SWP), or the emission operation (i.e., the first emission operation FEP or the second emission operation SEP) may be simultaneously performed for all pixel circuits 100 of the organic light emitting display device.

In an example embodiment, a first power voltage ELVDD may have a plurality of voltage levels, and a second power voltage ELVSS may have a fixed voltage level (e.g., 0V). In this case, a structure for providing the second power voltage ELVSS may be simplified because the second power voltage ELVSS has a fixed voltage level. However, a structure for providing the first power voltage ELVDD may be complicated because the first power voltage ELVDD has a plurality of voltage levels (e.g., a negative voltage level may be needed). In another example embodiment, the first power voltage ELVDD may have a plurality of voltage levels, and the second power voltage ELVSS may also have a plurality of voltage levels. In this case, driving signal waveforms may be simplified. However, a structure for providing the first power voltage ELVDD and a structure for providing the second power voltage ELVSS may be complicated. In still another example embodiment, the first power voltage ELVDD may have a fixed voltage level (e.g., 12V), and the second power voltage may have a plurality of voltage levels. In this case, a structure for providing the first power voltage ELVDD may be simplified because the first power voltage ELVDD has a fixed voltage level. However, a structure for providing the second power voltage ELVSS may be complicated because the second power voltage ELVSS has a plurality of voltage levels (e.g., a positive voltage level may be needed). Thus, the first power voltage ELVDD and the second power voltage ELVSS may be determined according to required conditions. For convenience, in the following description, the first power voltage ELVDD and the second power voltage ELVSS have a high voltage level or a low voltage level.

Figure 4A:
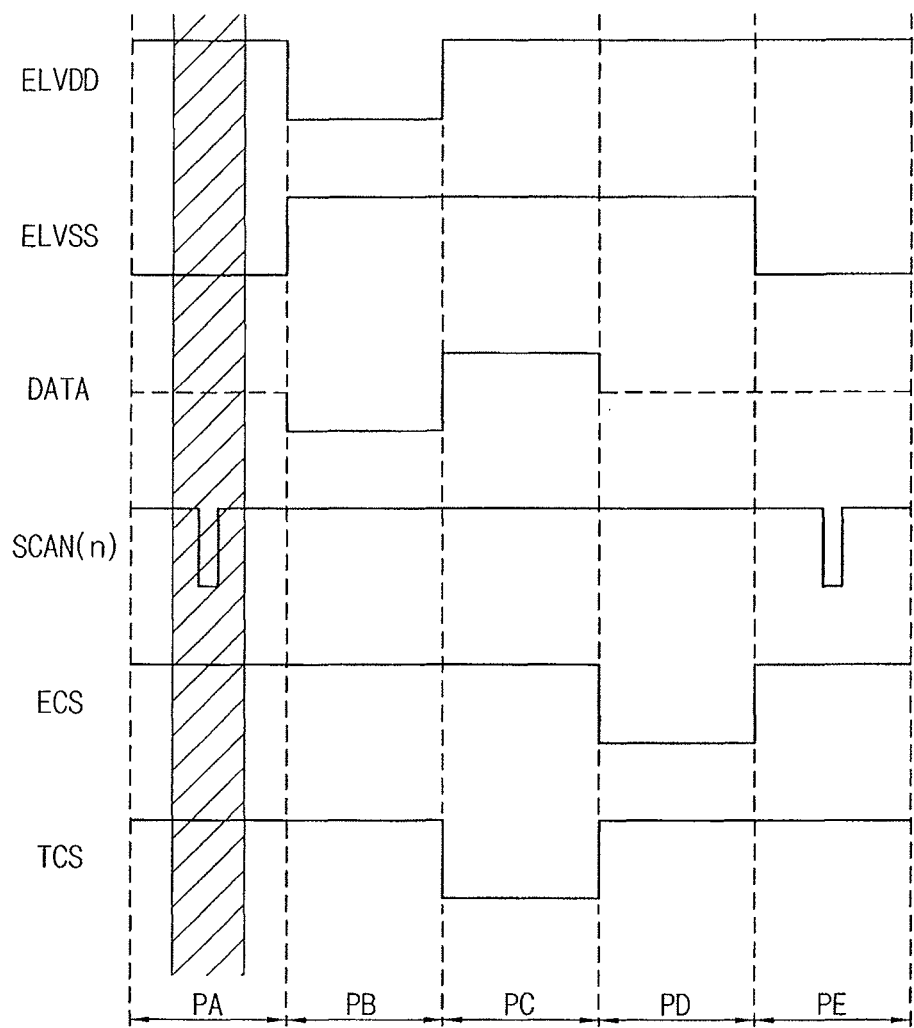
FIGS. 4A through 4E illustrate timing diagrams of an example operation of the pixel circuit of FIG. 1.

Referring to FIG. 4A, the first preliminary data writing operation FPDP may be performed in the first preliminary data writing period PA. As described above, the first preliminary data writing operation FPDP of the first display operation for displaying the first image and the second emission operation SEP of the second display operation for displaying the second image may be simultaneously performed. Thus, the second image may be displayed based on second image data stored in each pixel circuit 100 while first image data DATA is written into each pixel circuit 100 in the first preliminary data writing period PA. In detail, in the first preliminary data writing period PA, the first power voltage ELVDD may have a high voltage level, and the second power voltage ELVSS may have a logic low level. In addition, the emission control signal ECS may have a high voltage level, and the compensation control signal TCS may also have a high voltage level. Thus, the third and fourth PMOS transistors PT3 and PT4 may turn off in the pixel circuit 100 of FIG. 1. When the fourth PMOS transistor PT4 turns off, the first region FA may be separated from the second region SA in the pixel circuit 100 of FIG. 1, and an operation of the first region FA may be independent from an operation of the second region SA. As a result, in the first region FA, when the fifth PMOS transistor PT5 turns on in response to a scan signal that is applied through the scan line SL, the first image data DATA that is applied through the data line DL may be stored in the third capacitor C3. At the same time, in the second region SA, the organic light emitting diode OLED may emit light based on a current flowing from the first power voltage ELVDD having a high voltage level to the second power voltage ELVSS having a low voltage level.

The first power voltage ELVDD, the second power voltage ELVSS, the emission control signal ECS, and the compensation control signal TCS may be simultaneously applied to all pixel circuits 100 of the organic light emitting display device. On the other hand, the first image data DATA may be sequentially applied to all pixel circuits 100 of the organic light emitting display device (i.e., when the fifth PMOS transistor PT5 turns on in response to a scan signal SCAN(n) having a low voltage level (see FIG. 1)). Referring to FIG. 4A, the first power voltage ELVDD, the second power voltage ELVSS, the emission control signal ECS, and the compensation control signal TCS may be simultaneously applied to all pixel circuits 100 in all periods PA, PB, PC, PD, and PE, whereas the first image data DATA may be sequentially applied to all pixel circuits 100 only in the first preliminary data writing period PA. Thus, the first preliminary data writing operation FPDP of the first display operation may be sequentially performed for all pixel circuits 100, and the second emission operation SEP of the second display operation may be simultaneously performed for all pixel circuits 100.

As described above, in the organic light emitting display device having the pixel circuit 100 of FIG. 1, while the second image (i.e., the right image or the left image) is displayed by each pixel circuit 100, the first image data DATA (i.e., the left image data or the right image data) may be stored in the third capacitor C3 of each pixel circuit 100. Similarly, while the first image (i.e., the left image or the right image) is displayed by each pixel circuit 100, the second image data DATA (i.e., the right image data or the left image data) may be stored in the third capacitor C3 of each pixel circuit 100.

Figure 4B:
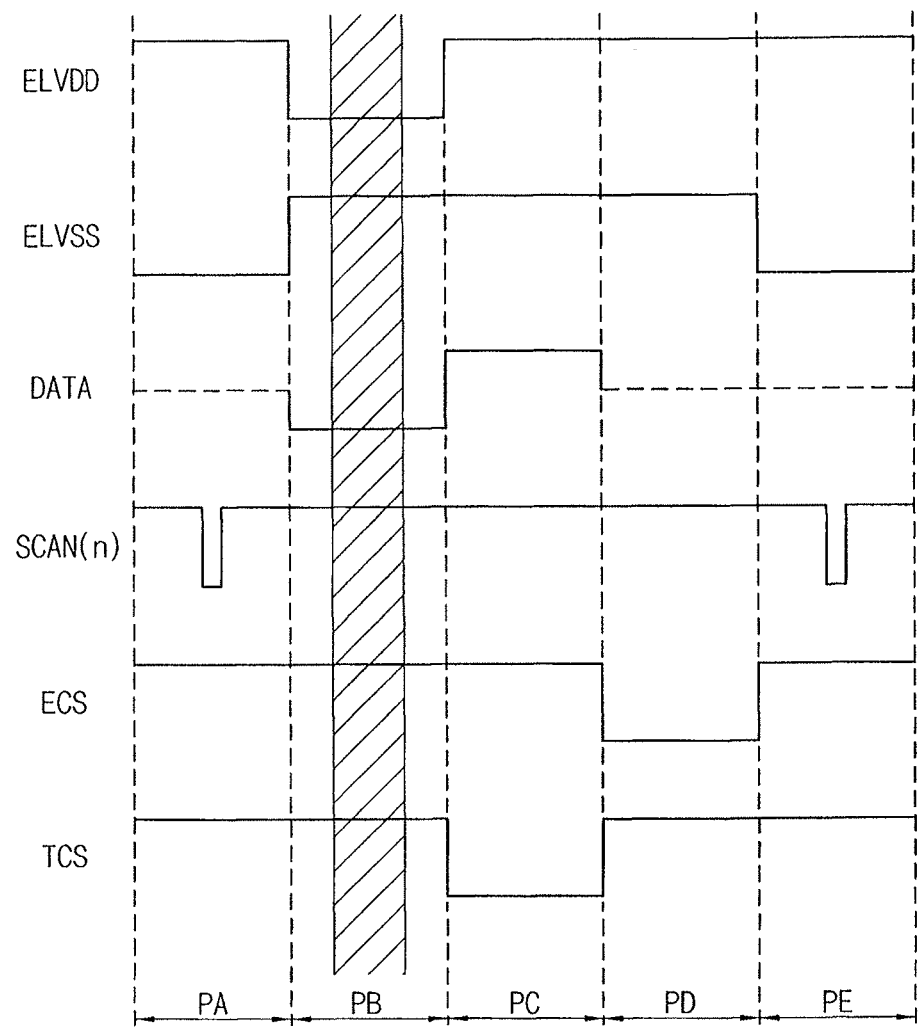

Referring to FIG. 4B, the first reset operation FIP may be performed in the first reset period PB. In detail, in the first reset period PB, the first power voltage ELVDD may have a low voltage level, and the second power voltage ELVSS may have a high voltage level. In addition, the emission control signal ECS may have a high voltage level, and the compensation control signal TCS may also have a high voltage level. Thus, the third and fourth PMOS transistors PT3 and PT4 may turn off in the pixel circuit 100 of FIG. 1. When the fourth PMOS transistor PT4 turns off, the first region FA may be separated from the second region SA in the pixel circuit 100 of FIG. 1 and operation of the first region FA may be independent from an operation of the second region SA. The second power voltage ELVSS is higher than the first power voltage ELVDD. Thus, the first reset operation FIP may be performed in the second region SA, and an anode electrode of the organic light emitting diode OLED may be initialized to have the second power voltage ELVSS, such that the pixel circuit 100 of FIG. 1 may be initialized and reset in the first reset period PB. The first power voltage ELVDD, the second power voltage ELVSS, the emission control signal ECS, and the compensation control signal TCS may be simultaneously applied to all pixel circuits 100 of the organic light emitting display device. Thus, referring to FIG. 4B, the first reset operation FIP of the first display operation may be simultaneously performed for all pixel circuits 100 of the organic light emitting display device.

Figure 4C:
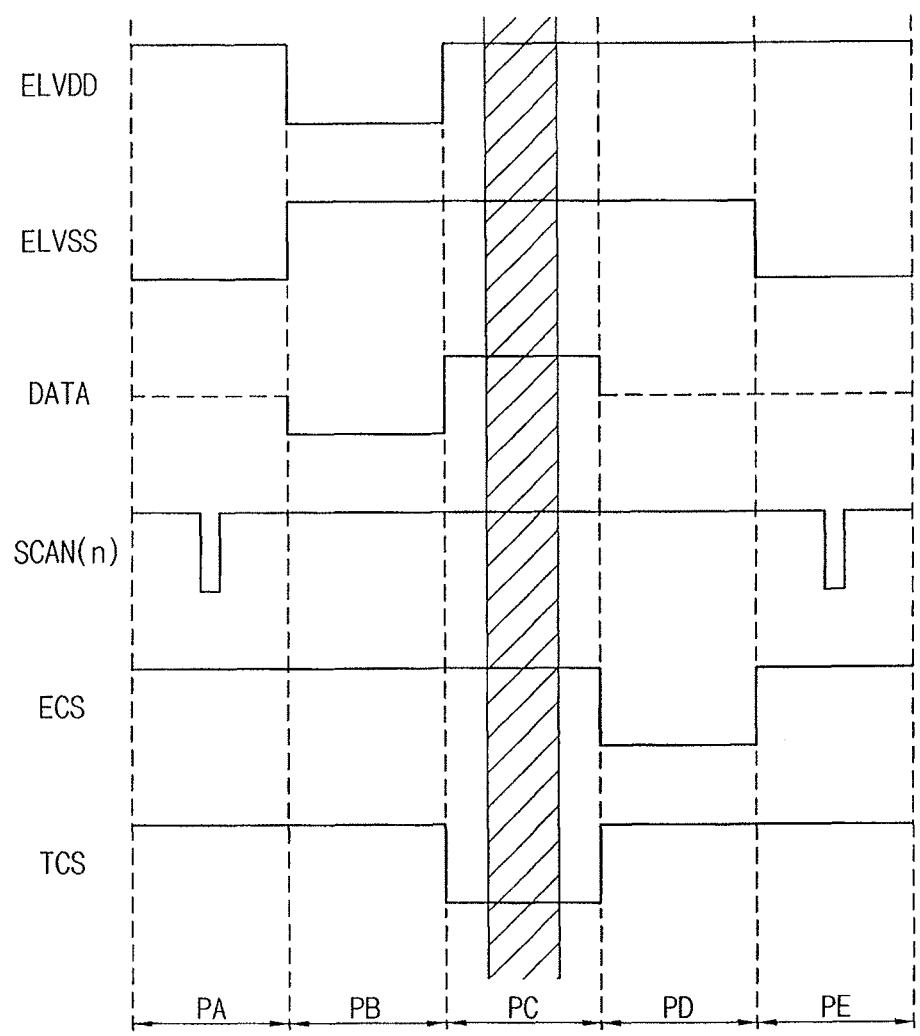

Referring to FIG. 4C, the first threshold voltage compensation operation FVP may be performed in the first threshold voltage compensation period PC. In detail, in the first threshold voltage compensation period PC, the first power voltage ELVDD may have a high voltage level, and the second power voltage ELVSS may also have a high voltage level. In addition, the emission control signal ECS may have a high voltage level, and the compensation control signal TCS may have a low voltage level. Thus, in the pixel circuit 100 of FIG. 1, the second and third PMOS transistors PT2 and PT3 may turn on, and the fourth and fifth PMOS transistors PT4 and PT5 may turn off. When the fourth PMOS transistor PT4 turns off, the first region FA may be separated from the second region SA in the pixel circuit 100 of FIG. 1, and an operation of the first region FA may be independent from an operation of the second region SA. As a result, a gate terminal of the first PMOS transistor PT1 may have a voltage ELVDD-Vth (generated by subtracting a threshold voltage Vth of the first PMOS transistor PT1 from the first power voltage ELVDD). In addition, a first voltage V0 (i.e., a specific high voltage) may be stored in the second capacitor C2. The first power voltage ELVDD, the second power voltage ELVSS, the emission control signal ECS, and the compensation control signal TCS may be simultaneously applied to all pixel circuits 100 of the organic light emitting display device. Thus, the first threshold voltage compensation operation FVP of the first display operation may be simultaneously performed for all pixel circuits 100 of the organic light emitting display device.

Figure 4D:
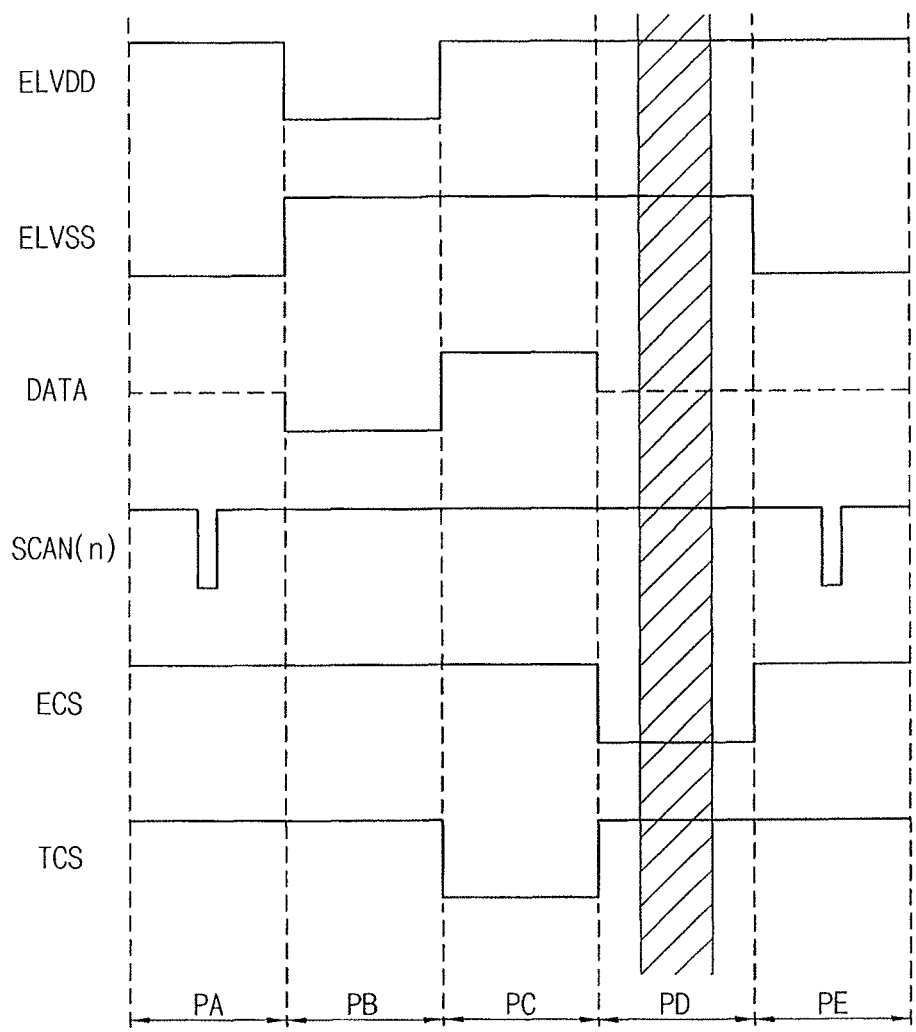

Referring to FIG. 4D, the first data writing operation FWP may be performed in the first data writing period PD. In detail, in the first data writing period PD, the first power voltage ELVDD may have a high voltage level, and the second power voltage ELVSS may also have a high voltage level. In addition, the emission control signal ECS may have a low voltage level, and the compensation control signal TCS may have a high voltage level. Thus, in the pixel circuit 100 of FIG. 1, the fourth and fifth PMOS transistors PT4 and PT5 may turn on, and the second and third PMOS transistors PT2 and PT3 may turn off. When the fourth PMOS transistor PT4 turns on, the first region FA may be coupled to the second region SA in the pixel circuit 100 of FIG. 1 and, when the first region FA is coupled to the second region SA, the first image data DATA that is stored in the third capacitor C3 by the first preliminary data writing operation FPDP may be transferred to the second region SA. As a result, a voltage of a gate terminal (i.e., the first node N1) of the first PMOS transistor PT1 may be changed by the first image data DATA. In detail, when the first image data DATA is provided to the second region SA, a voltage of the gate terminal (i.e., the first node N1) of the first PMOS transistor PT1 may be determined according to [Expression 1] and [Expression 2] below.

$$V_{\it{eff}} = \frac{C_{HOLD} \times V_{DATA} + (C_{ST} + C_{VTH}) \times V_O}{C_{HOLD} + C_{ST} + C_{VTH}} \qquad \text{[Expression 1]}$$

(where, Veff denotes a voltage corresponding to an effective data, $C_{HOLD}$ denotes a capacitance of the third capacitor C3, $V_{DATA}$ denotes a voltage corresponding to the first image data DATA, $C_{ST}$ denotes a capacitance of the second capacitor C2, $C_{VTH}$ denotes a capacitance of the first capacitor C1, and Vo denotes the first voltage stored in the second capacitor C2.)

$$V_{G.TI} = V_{ELVDD} - V_{TH} + (V_{\it{eff}} - V_O) \qquad \text{[Expression 2]}$$

(where, $V_{G.TI}$ denotes a voltage of the gate terminal of the first PMOS transistor PT1, $V_{ELVDD}$ denotes a voltage corresponding to the first power voltage ELVDD, and $V_{TH}$ denotes a threshold voltage of the first PMOS transistor PT1.)

Figure 4E:
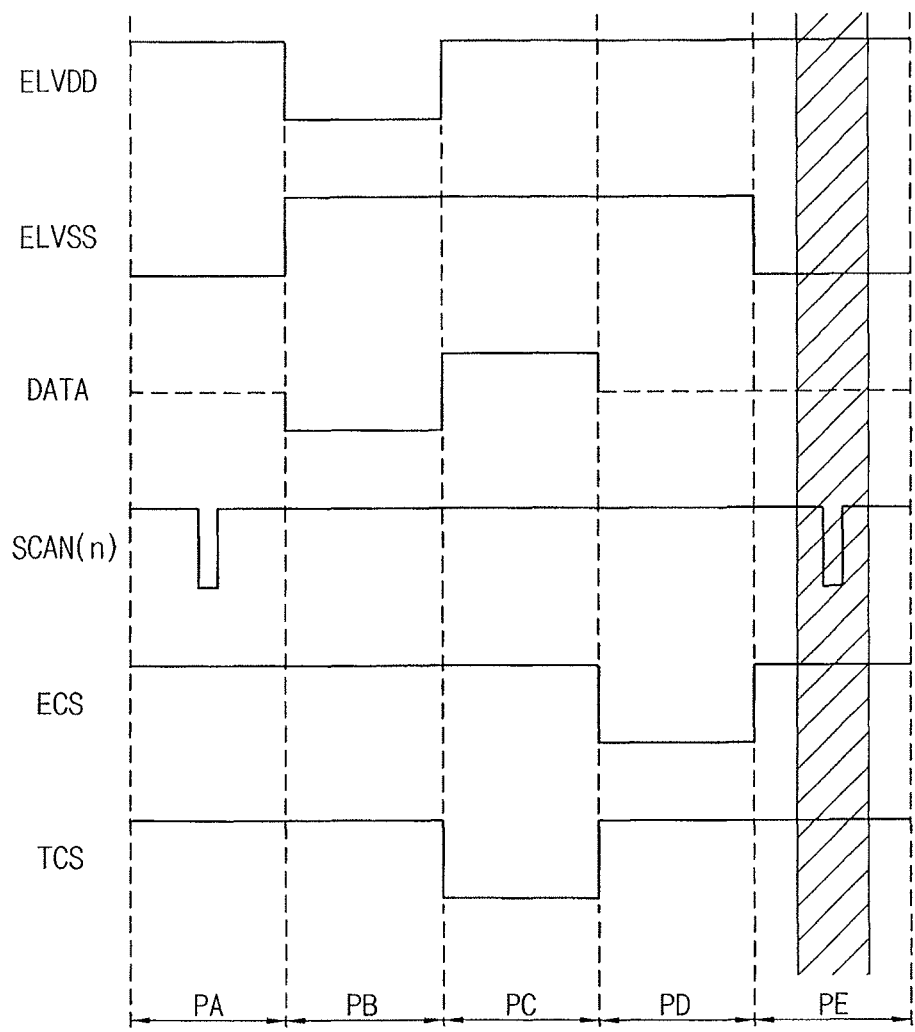

Referring to FIG. 4E, the first emission operation FEP may be performed in the first emission period PE. In detail, in the first emission period PE, the first power voltage ELVDD may have a high voltage level, and the second power voltage ELVSS may have a low voltage level. In addition, the emission control signal ECS may have a high voltage level, and the compensation control signal TCS may also have a high voltage level. Thus, the third and fourth PMOS transistors PT3 and PT4 may turn off in the pixel circuit 100 of FIG. 1. When the fourth PMOS transistor PT4 turns off, the first region FA may be separated from the second region SA in the pixel circuit 100 of FIG. 1, and an operation of the first region FA may be independent from an operation of the second region SA. Similar to FIG. 4A, the second preliminary data writing operation SPDP of the second display operation and the first emission operation FEP of the first display operation may be simultaneously performed. Thus, the second image data may be written into each pixel circuit 100 while the first image is displayed based on the first image data DATA stored in each pixel circuit 100. As a result, in the first region FA, when the fifth PMOS transistor PT5 turns on in response to a scan signal applied through the scan line SL, the second image data applied through the data line DL may be stored in the third capacitor C3. At the same time, in the second region SA, the organic light emitting diode OLED may emit light based on a current flowing from the first power voltage ELVDD having a high voltage level to the second power voltage ELVSS having a low voltage level.

The first power voltage ELVDD, the second power voltage ELVSS, the emission control signal ECS, and the compensation control signal TCS may be simultaneously applied to all pixel circuits 100 of the organic light emitting display device. On the other hand, the second image data may be sequentially applied to all pixel circuits 100 of the organic light emitting display device (i.e., when the fifth PMOS transistor PT5 turns on in response to a scan signal SCAN[n] having a low voltage level). Thus, the first emission operation FEP of the first display operation may be simultaneously performed for all pixel circuits 100, and the second preliminary data writing operation SPDP of the second display operation may be sequentially performed for all pixel circuits 100.

A current flowing through the organic light emitting diode OLED may be determined based on a voltage of the gate terminal of the first PMOS transistor PT1. That is, a current flowing through the organic light emitting diode OLED may be substantially determined based on the effective data Veff and the first voltage V0 stored in the second capacitor C2. In detail, the organic light emitting display device may operate based on a simultaneous emission method in which all pixel circuits 100 simultaneously emit light. Here, a current flowing through the organic light emitting diode OLED of each pixel circuit 100 may be determined according to [Expression 3] below.

$$I_D = \frac{1}{2}\mu C_{ox}\frac{W}{L}(V_{GS} - V_{TH})^2 = \frac{1}{2}\mu C_{ox}\frac{W}{L}(V_{eff} - V_O)^2 \quad \text{[Expression 3]}$$

(where, ID denotes a current flowing through the organic light emitting diode OLED, $$\frac{1}{2}\mu C_{ox}\frac{W}{L}$$

is a unique constant, $V_{GS}$ denotes a voltage difference between the gate terminal and the source terminal of the first PMOS transistor PT1, $V_{TH}$ denotes a threshold voltage of the first PMOS transistor PT1, Veff denotes a voltage corresponding to the effective data, and Vo denotes the first voltage stored in the second capacitor C2.)

Although the first display operation for displaying the first image (i.e., the first preliminary data writing period PA, the first reset period PB, the first threshold voltage compensation period PC, the first data writing period PD, and the first emission period PE) and the second display operation for displaying the second image (i.e., the second preliminary data writing period PA, the second reset period PB, the second threshold voltage compensation period PC, the second data writing period PD, and the second emission period PE) are described with reference to FIGS. 4A through 4E, it should be understood that the driving signal waveforms illustrated in FIGS. 4A through 4E are simplified for convenience of descriptions. Thus, for example, the pixel circuit 100 of FIG. 1 may operate based on more complicated driving signal waveforms.

Figure 5:
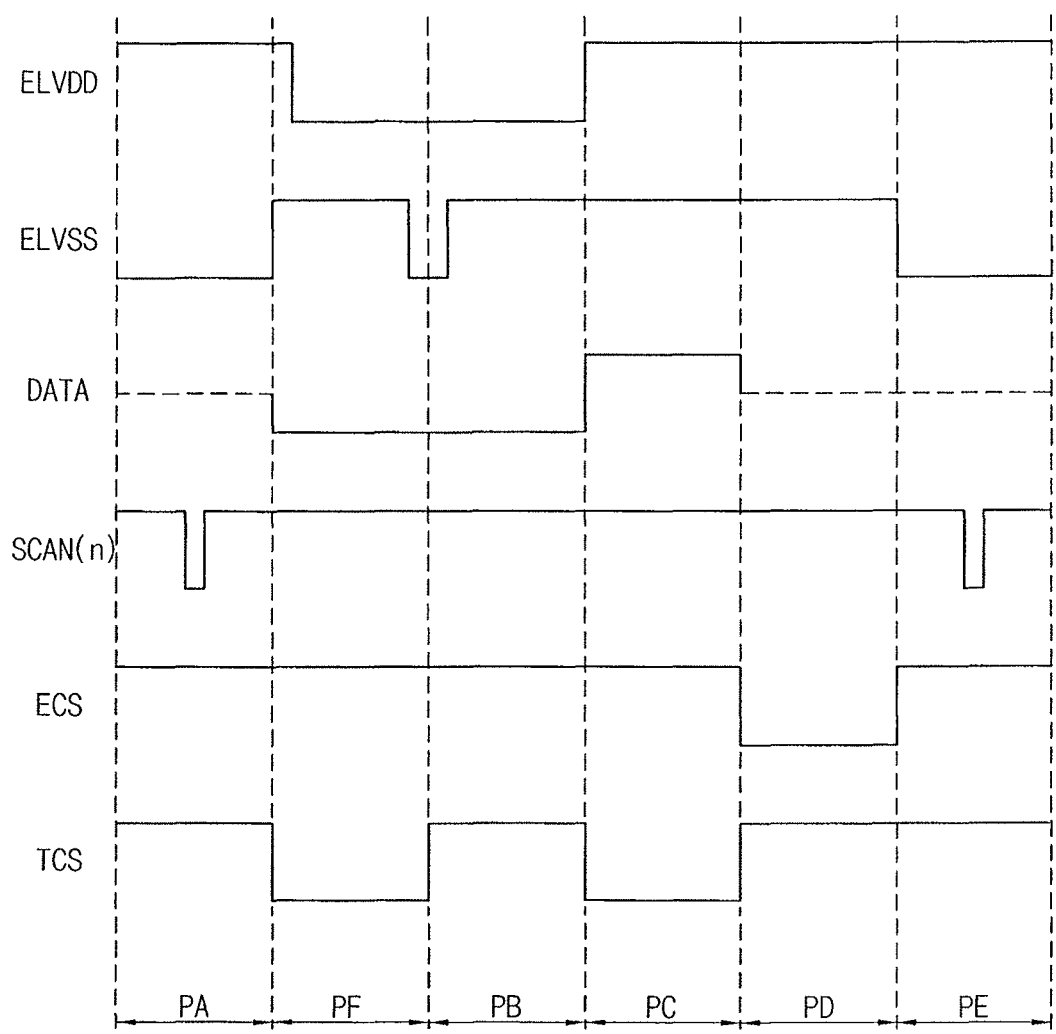
FIG. 5 illustrates a timing diagram of another example operation of the pixel circuit of FIG. 1.

FIG. 5 illustrates a timing diagram of another example of operation of the pixel circuit of FIG. 1.

Referring to FIG. 5, a period of a first display operation for displaying a first image (e.g., a left image) may include a first preliminary data writing period PA, a first off-bias applying period PF, a first reset period PB, a first threshold voltage compensation period PC, a first data writing period PD, and a first emission period PE. Similarly, a period of a second display operation for displaying a second image (e.g., a right image) may include a second preliminary data writing period PA, a second off-bias applying period PF, a second reset period PB, a second threshold voltage compensation period PC, a second data writing period PD, and a second emission period PE. For convenience, the following description of FIG. 5 will focus on the first display operation for displaying the first image. As described above, the first and second power voltages ELVDD and ELVSS may be determined according to required conditions. For convenience of description, however, it will be described below that the first power voltage ELVDD and the second power voltage ELVSS have a high voltage level or a low voltage level. In addition, the first preliminary data writing period PA, the first reset period PB, the first threshold voltage compensation period PC, the first data writing period PD, and the first emission period PE are described above, and details thereof will not be repeated below.

As illustrated in FIG. 5, a period of the first display operation for displaying the first image (e.g., the left image) may include the first off-bias applying period PF prior to the first reset period PB. The first off-bias applying period PF may be used as a period for improving a step response waveform by applying an off-bias to the pixel circuit 100 of FIG. 1. Thus, the first off-bias applying period PF may be set to reduce or prevent crosstalk in the organic light emitting display device. For example, the first off-bias applying period PF may be set to prevent a hysteresis (i.e., shift) of a characteristic curve of the first PMOS transistor PT1 (i.e., a driving transistor). As a result, a position of a characteristic curve of the first PMOS transistor PT1 may be fixed (i.e., may be reset) in the first off-bias applying period PF before a threshold voltage of the first PMOS transistor PT1 is compensated. Thus, a position of a characteristic curve of the first PMOS transistor PT1 may be fixed regardless of a data signal (e.g., the left image data or the right image data) of a previous frame.

In detail, in the first off-bias applying period PF, the emission control signal ECS may have a high voltage level, and the compensation control signal TCS may have a low voltage level. In addition, the second power voltage ELVSS may have a high voltage level, and the first power voltage ELVDD may have a low voltage level. Hence, the fourth PMOS transistor PT4 may turn off, and the second and third PMOS transistors PT2 and PT3 may turn on. When the fourth PMOS transistor PT4 turns off, the first region FA may be separated from the second region SA in the pixel circuit 100 of FIG. 1, and an operation of the first region FA may be independent from an operation of the second region SA. At this time, the second region SA may perform the first off-bias applying operation because the second power voltage ELVSS is maintained to be greater than the first power voltage ELVDD for a predetermined time while the second and third PMOS transistors PT2 and PT3 turn on.

Although not illustrated in FIG. 5, a period in which the second power voltage ELVSS has a high voltage level and the first power voltage ELVDD also has a high voltage level may be inserted between the first off-bias applying period PF and the first reset period PB. In another implementation, a period in which the second power voltage ELVSS has a low voltage level and the first power voltage ELVDD also has a low voltage level may be inserted between the first off-bias applying period PF and the first reset period PB. The period may prevent interference between the first off-bias applying operation and the first reset operation when the first display operation is performed. Although the first display operation for displaying the first image (i.e., the first preliminary data writing period PA, the first off-bias applying period PF, the first reset period PB, the first threshold voltage compensation period PC, the first data writing period PD, and the first emission period PE) and the second display operation for displaying the second image (i.e., the second preliminary data writing period PA, the second off-bias applying period PF, the second reset period PB, the second threshold voltage compensation period PC, the second data writing period PD, and the second emission period PE) are described with reference to FIG. 5, it should be understood that the driving signal waveforms illustrated in FIG. 5 are simplified for convenience of description, and thus other driving signal waveforms may be used for operating the pixel circuit 100 of FIG. 1.

Figure 6:
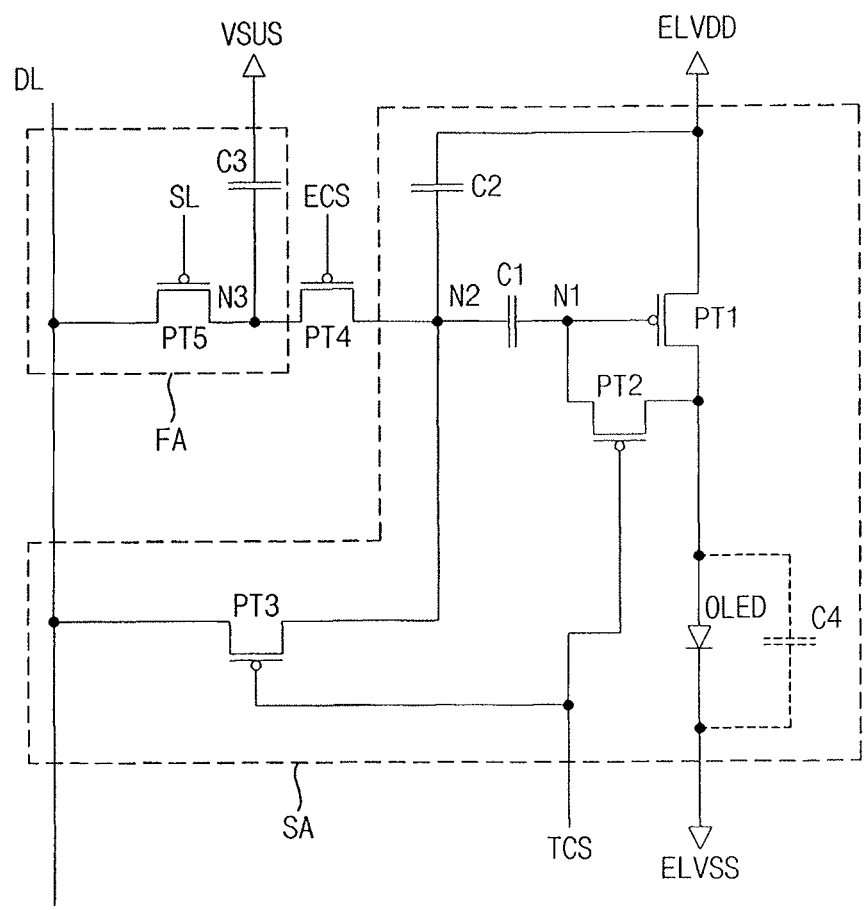
FIG. 6 illustrates a circuit diagram of a pixel circuit according to example embodiments.

FIG. 6 illustrates a circuit diagram of a pixel circuit 200 according to example embodiments.

Referring to FIG. 6, the pixel circuit 200 may include an organic light emitting diode OLED, first through fifth PMOS transistors PT1 through PT5, and first through third capacitors C1 through C3. The pixel circuit 200 may have a 5T-3C structure (i.e., a structure having five transistors and three capacitors). In an example embodiment, the pixel circuit 200 may further include a fourth capacitor C4 coupled between an anode electrode and a cathode electrode of the organic light emitting diode OLED.

The organic light emitting diode OLED may be coupled between a second power voltage ELVSS and the first PMOS transistor PT1. In detail, a cathode electrode of the organic light emitting diode OLED may be coupled to the second power voltage ELVSS, and an anode electrode of the organic light emitting diode OLED may be coupled to a first terminal of the first PMOS transistor PT1. Thus, the organic light emitting diode OLED may emit light based on a current that is controlled by the first PMOS transistor PT1. The first PMOS transistor PT1 may be coupled between a first power voltage ELVDD and the anode electrode of the organic light emitting diode OLED. A gate terminal of the first PMOS transistor PT1 may be coupled to a first node N1. The first PMOS transistor PT1 may be a driving transistor that controls a current flowing through the organic light emitting diode OLED. As illustrated in FIG. 6, the first node N1 is a node at which a first terminal of the first capacitor C1, a first terminal of the second PMOS transistor PT2, and the gate terminal of the first PMOS transistor PT1 are coupled to each other. The second PMOS transistor PT2 may be coupled between the first node N1 and the anode electrode of the organic light emitting diode OLED. A gate terminal of the second PMOS transistor PT2 may receive a compensation control signal TCS. In detail, the first terminal of the second PMOS transistor PT2 may be coupled to the first node N1, and a second terminal of the second PMOS transistor PT2 may be coupled to the first terminal of the first PMOS transistor PT1. Thus, when the second PMOS transistor PT2 turns on in response to the compensation control signal TCS, the first PMOS transistor PT1 may be diode-coupled.

The first capacitor C1 may be coupled between the first node N1 and a second node N2. In detail, the first terminal of the first capacitor C1 may be coupled to the first node N1, and a second terminal of the first capacitor C1 may be coupled to the second node N2. The first capacitor C1 may be a threshold voltage compensation capacitor. As illustrated in FIG. 6, the second node N2 is a node at which a second terminal of the first capacitor C1, a first terminal of the second capacitor C2, a first terminal of the third PMOS transistor PT3, and a first terminal of the fourth PMOS transistor PT4 are coupled to each other. The second capacitor C2 may be coupled between the first power voltage ELVDD and the second node N2. The second capacitor C2 may be a storage capacitor. In detail, the first terminal of the second capacitor C2 may be coupled to the second node N2, and a second terminal of the second capacitor C2 may be coupled to the first power voltage ELVDD. The third PMOS transistor PT3 may be coupled between a data line DL and the second node N2. A gate terminal of the third PMOS transistor PT3 may receive the compensation control signal TCS. In detail, the first terminal of the third PMOS transistor PT3 may be coupled to the second node N2, a second terminal of the third PMOS transistor PT3 may be coupled to the data line DL, and the gate terminal of the third PMOS transistor PT3 may be coupled to the gate terminal of the second PMOS transistor PT2. The fourth PMOS transistor PT4 may be coupled between a third node N3 and the second node N2. A gate terminal of the fourth PMOS transistor PT4 may receive an emission control signal ECS. In detail, the first terminal of the fourth PMOS transistor PT4 may be coupled to the second node N2, and a second terminal of the fourth PMOS transistor PT4 may be coupled to the third node N3. As illustrated in FIG. 6, the third node N3 is a node at which the second terminal of the fourth PMOS transistor PT4, a first terminal of the fifth PMOS transistor PT5, and a first terminal of the third capacitor C3 are coupled to each other.

The third capacitor C3 may be coupled between the third node N3 and a sustain power voltage VSUS. In detail, the first terminal of the third capacitor C3 may be coupled to the third node N3, and a second terminal of the third capacitor C3 may be coupled to the sustain power voltage VSUS. In FIG. 6, since the sustain power voltage VSUS is applied to the third capacitor C3, a fluctuation of a data signal (e.g., left image data or right image data) stored in the third capacitor C3 may be prevented. That is, the sustain power voltage VSUS may be a predetermined DC voltage to prevent the fluctuation of the data signal stored in the third capacitor C3. The fifth PMOS transistor PT5 may be coupled between the data line DL and the third node N3. A gate terminal of the fifth PMOS transistor PT5 may be coupled to a scan line SL. In detail, the first terminal of the fifth PMOS transistor PT5 may be coupled to the third node N3, a second terminal of the fifth PMOS transistor PT5 may be coupled to the data line DL, and the gate terminal of the fifth PMOS transistor PT5 may be coupled to the scan line SL. The data line DL may be coupled to a data driving unit of an organic light emitting display device to provide the data signal (e.g., the left image data or the right image data). In addition, the scan line SL may be coupled to a scan driving unit of the organic light emitting display device to provide a scan signal.

As described above, the pixel circuit 200 may have a 5T-3C structure that includes the organic light emitting diode OLED, the first through fifth PMOS transistors PT1 through PT5, and the first through third capacitors C1 through C3. An organic light emitting display device having the pixel circuit 200 may implement a stereoscopic image by alternately displaying a left image and a right image based on a simultaneous emission method. For example, the right image data may be sequentially written into each pixel circuit 200 of the organic light emitting display device while the left image is simultaneously displayed by each pixel circuit 200 of the organic light emitting display device. Similarly, left image data may be sequentially written into each pixel circuit 200 of the organic light emitting display device while the right image is simultaneously displayed by each pixel circuit 200 of the organic light emitting display device.

As illustrated in FIG. 6, the pixel circuit 200 may include a first region FA and a second region SA. In the following description, the first region FA includes the third capacitor C3 and the fifth PMOS transistor PT5, and the second region SA includes the first and second capacitors C1 and C2 and the first through fourth PMOS transistors PT1 through PT4. When the fourth PMOS transistor PT4 turns on, the first region FA may be coupled to the second region SA. When the fourth PMOS transistor PT4 turns off, the first region FA may be separated from the second region SA. In detail, when the fourth PMOS transistor PT4 turns on, the first region FA may be coupled to the second region SA in the pixel circuit 200. As a result, a data signal (e.g., the left image data or the right image data) stored in the third capacitor C3 may be transferred to the second region SA. On the other hand, when the fourth PMOS transistor PT4 turns off, the first region FA may be separated from the second region SA in the pixel circuit 200. As a result, the first region FA and the second region SA may perform respective operations. In detail, an emission operation may be performed in the second region SA while a preliminary data writing operation is performed in the first region FA. Thus, an operation of the first region FA may be independent from an operation of the second region SA. For example, when the fourth PMOS transistor PT4 turns off in response to the emission control signal ECS, the first image (e.g., the left image or the right image) may be displayed by the first and second PMOS transistors PT1 and PT2, the first and second capacitors C1 and C2, and the organic light emitting diode OLED (i.e., an operation of the second region SA). At the same time, the second image data (e.g., the right image data or the left image data) input through the data line DL may be stored in the third capacitor C3 when the fifth PMOS transistor PT5 turns on in response to a scan signal input through the scan line SL (i.e., an operation of the first region FA).

Figure 7:
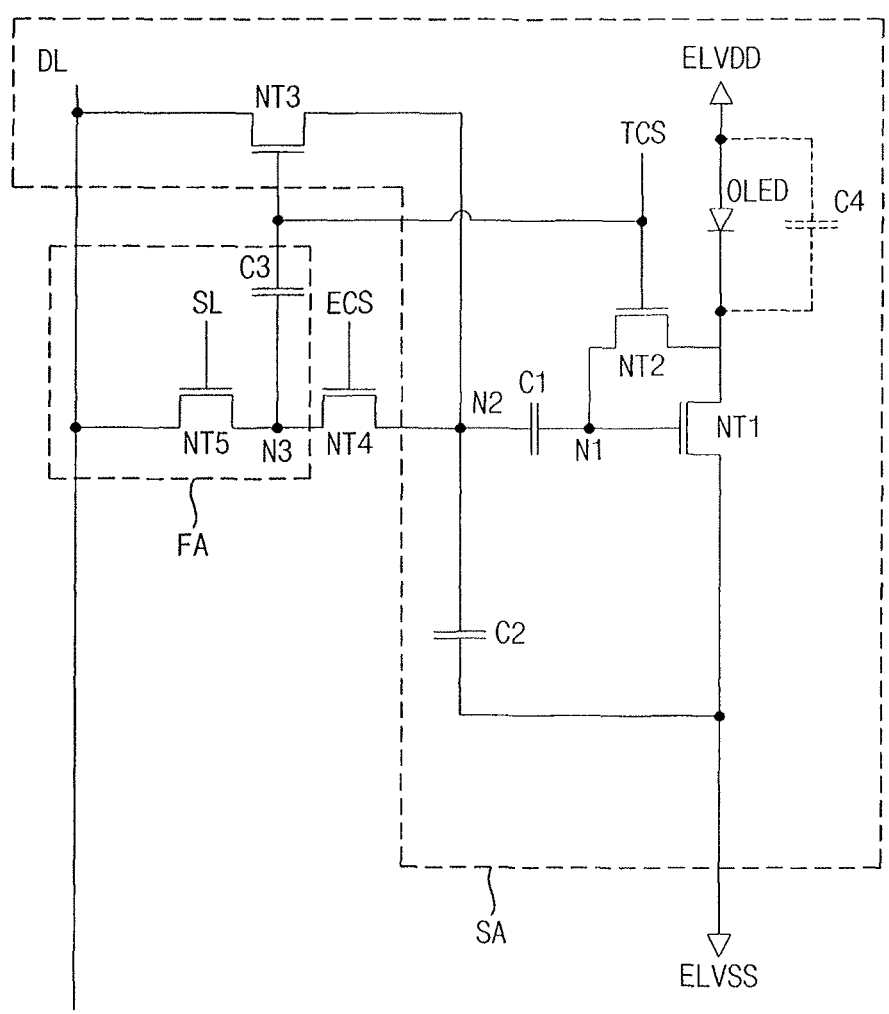
FIG. 7 illustrates a circuit diagram of a pixel circuit according to example embodiments.

FIG. 7 illustrates a circuit diagram of a pixel circuit 300 according to example embodiments.

Referring to FIG. 7, the pixel circuit 300 may include an organic light emitting diode OLED, first through fifth n-channel metal oxide semiconductor (NMOS) transistors NT1 through NT5, and first through third capacitors C1 through C3. The pixel circuit 300 may have a 5T-3C structure (i.e., a structure having five transistors and three capacitors). In an example embodiment, the pixel circuit 300 may further include a fourth capacitor C4 coupled between an anode electrode and a cathode electrode of the organic light emitting diode OLED.

The organic light emitting diode OLED may be coupled between a first power voltage ELVDD and the first NMOS transistor NT1. In detail, an anode electrode of the organic light emitting diode OLED may be coupled to the first power voltage ELVDD, and a cathode electrode of the organic light emitting diode OLED may be coupled to a first terminal of the first NMOS transistor NT1. Thus, the organic light emitting diode OLED may emit light based on a current that is controlled by the first NMOS transistor NT1. The first NMOS transistor NT1 may be coupled between a second power voltage ELVSS and the cathode electrode of the organic light emitting diode OLED. A gate terminal of the first NMOS transistor NT1 may be coupled to a first node N1. The first NMOS transistor NT1 may be a driving transistor that controls a current flowing through the organic light emitting diode OLED. As illustrated in FIG. 7, the first node N1 is a node at which a first terminal of the first capacitor C1, a first terminal of the second NMOS transistor NT2, and the gate terminal of the first NMOS transistor NT1 are coupled to each other. The second NMOS transistor NT2 may be coupled between the first node N1 and the cathode electrode of the organic light emitting diode OLED. A gate terminal of the second NMOS transistor NT2 may receive a compensation control signal TCS. In detail, the first terminal of the second NMOS transistor NT2 may be coupled to the first node N1, and a second terminal of the second NMOS transistor NT2 may be coupled to the first terminal of the first NMOS transistor NT1. Thus, when the second NMOS transistor NT2 turns on in response to the compensation control signal TCS, the first NMOS transistor NT1 may be diode-coupled.

The first capacitor C1 may be coupled between the first node N1 and a second node N2. In detail, the first terminal of the first capacitor C1 may be coupled to the first node N1, and a second terminal of the first capacitor C1 may be coupled to the second node N2. The first capacitor C1 may be a threshold voltage compensation capacitor. As illustrated in FIG. 7, the second node N2 is a node at which the second terminal of the first capacitor C1, a first terminal of the second capacitor C2, a first terminal of the third NMOS transistor NT3, and a first terminal of the fourth NMOS transistor NT4 are coupled to each other. The second capacitor C2 may be coupled between the second power voltage ELVSS and the second node N2. The second capacitor C2 may be a storage capacitor. In detail, the first terminal of the second capacitor C2 may be coupled to the second node N2, and a second terminal of the second capacitor C2 may be coupled to the second power voltage ELVSS. The third NMOS transistor NT3 may be coupled between a data line DL and the second node N2. A gate terminal of the third NMOS transistor NT3 may receive the compensation control signal TCS. In detail, the first terminal of the third NMOS transistor NT3 may be coupled to the second node N2, a second terminal of the third NMOS transistor NT3 may be coupled to the data line DL, and the gate terminal of the third NMOS transistor NT3 may be coupled to the gate terminal of the second NMOS transistor NT2. The fourth NMOS transistor NT4 may be coupled between a third node N3 and the second node N2. A gate terminal of the fourth NMOS transistor NT4 may receive an emission control signal ECS. In detail, the first terminal of the fourth NMOS transistor NT4 may be coupled to the second node N2, and a second terminal of the fourth NMOS transistor NT4 may be coupled to the third node N3. As illustrated in FIG. 7, the third node N3 is a node at which the second terminal of the fourth NMOS transistor NT4, a first terminal of the fifth NMOS transistor NT5, and a first terminal of the third capacitor C3 are coupled to each other.

The third capacitor C3 may be coupled between the third node N3 and the gate terminal of the third NMOS transistor NT3. In detail, the first terminal of the third capacitor C3 may be coupled to the third node N3, and a second terminal of the third capacitor C3 may be coupled to the gate terminal of the third NMOS transistor NT3. The fifth NMOS transistor NT5 may be coupled between the data line DL and the third node N3. A gate terminal of the fifth NMOS transistor NT5 may be coupled to a scan line SL. In detail, the first terminal of the fifth NMOS transistor NT5 may be coupled to the third node N3, a second terminal of the fifth NMOS transistor NT5 may be coupled to the data line DL, and the gate terminal of the fifth NMOS transistor NT5 may be coupled to the scan line SL. The data line DL may be coupled to a data driving unit of an organic light emitting display device to provide a data signal (e.g., left image data or right image data). In addition, the scan line SL may be coupled to a scan driving unit of the organic light emitting display device to provide a scan signal.

As described above, the pixel circuit 300 may have a 5T-3C structure that includes the organic light emitting diode OLED, the first through fifth NMOS transistors NT1 through NT5, and the first through third capacitors C1 through C3. An organic light emitting display device having the pixel circuit 300 may implement a stereoscopic image by alternately displaying a left image and a right image based on a simultaneous emission method. For example, the right image data may be sequentially written into each pixel circuit 300 of the organic light emitting display device while the left image is simultaneously displayed by each pixel circuit 300 of the organic light emitting display device. Similarly, the left image data may be sequentially written into each pixel circuit 300 of the organic light emitting display device while the right image is simultaneously displayed by each pixel circuit 300 of the organic light emitting display device.

As illustrated in FIG. 7, the pixel circuit 300 may include a first region FA and a second region SA. In the following description, the first region FA includes the third capacitor C3 and the fifth NMOS transistor NT5, and the second region SA includes the first and second capacitors C1 and C2 and the first through fourth NMOS transistors NT1 through NT4. When the fourth NMOS transistor NT4 turns on, the first region FA may be coupled to the second region SA. When the fourth NMOS transistor NT4 turns off, the first region FA may be separated from the second region SA. In detail, when the fourth NMOS transistor NT4 turns on, the first region FA may be coupled to the second region SA in the pixel circuit 300. As a result, a data signal (e.g., the left image data or the right image data) stored in the third capacitor C3 may be transferred to the second region SA. On the other hand, when the fourth NMOS transistor NT4 turns off, the first region FA may be separated from the second region SA in the pixel circuit 300. As a result, the first region FA and the second region SA may perform respective operations.

In detail, an emission operation may be performed in the second region SA while a preliminary data writing operation is performed in the first region FA. Thus, an operation of the first region FA may be independent from an operation of the second region SA. For example, when the fourth NMOS transistor NT4 turns off in response to the emission control signal ECS, the first image (e.g., the left image or the right image) may be displayed by the first and second NMOS transistors NT1 and NT2, the first and second capacitors C1 and C2, and the organic light emitting diode OLED (i.e., an operation of the second region SA). At the same time, the second image data (e.g., the right image data or the left image data) input through the data line DL may be stored in the third capacitor C3 when the fifth NMOS transistor NT5 turns on in response to a scan signal input through the scan line SL (i.e., an operation of the first region FA). Hereinafter, an operation of the pixel circuit 300 will be described in detail.

FIGS. 8A through 8E illustrate timing diagrams of an example operation of the pixel circuit of FIG. 7.

A first display operation for displaying a first image (e.g., a left image) may include a first preliminary data writing operation FPDP, a first reset operation FIP, a first threshold voltage compensation operation FVP, a first data writing operation FWP, and a first emission operation FEP. Similarly, a second display operation for displaying a second image (e.g., a right image) may include a second preliminary data writing operation SPDP, a second reset operation SIP, a second threshold voltage compensation operation SVP, a second data writing operation SWP, and a second emission operation SEP. The preliminary data writing operation (i.e., the first preliminary data writing operation FPDP or the second preliminary data writing operation SPDP) may be sequentially performed for all pixel circuits 300 of the organic light emitting display device by each scan line SL. On the other hand, the reset operation (i.e., the first reset operation FIP or the second reset operation SIP), the threshold voltage compensation operation (i.e., the first threshold voltage compensation operation FVP or the second threshold voltage compensation operation SVP), the data writing operation (i.e., the first data writing operation FWP or the second data writing operation SWP), or the emission operation (i.e., the first emission operation FEP or the second emission operation SEP) may be simultaneously performed for all pixel circuits 300 of the organic light emitting display device.

Referring to FIGS. 8A through 8E, the first preliminary data writing operation FPDP, the first reset operation FIP, the first threshold voltage compensation operation FVP, the first data writing operation FWP, and the first emission operation FEP may correspond to a first preliminary data writing period PA, a first reset period PB, a first threshold voltage compensation period PC, a first data writing period PD, and a first emission period PE. Similarly, the second preliminary data writing operation SPDP, the second reset operation SIP, the second threshold voltage compensation operation SVP, the second data writing operation SWP, and the second emission operation SEP may correspond to a second preliminary data writing period PA, a second reset period PB, a second threshold voltage compensation period PC, a second data writing period PD, and a second emission period PE. For convenience, the following description of FIGS. 8A through 8E will focus on the first display operation for displaying the first image. The first power voltage ELVDD and the second power voltage ELVSS may be determined according to required conditions. For convenience of description, it will be described below that the first power voltage ELVDD and the second power voltage ELVSS have a high voltage level or a low voltage level.

Figure 8A:
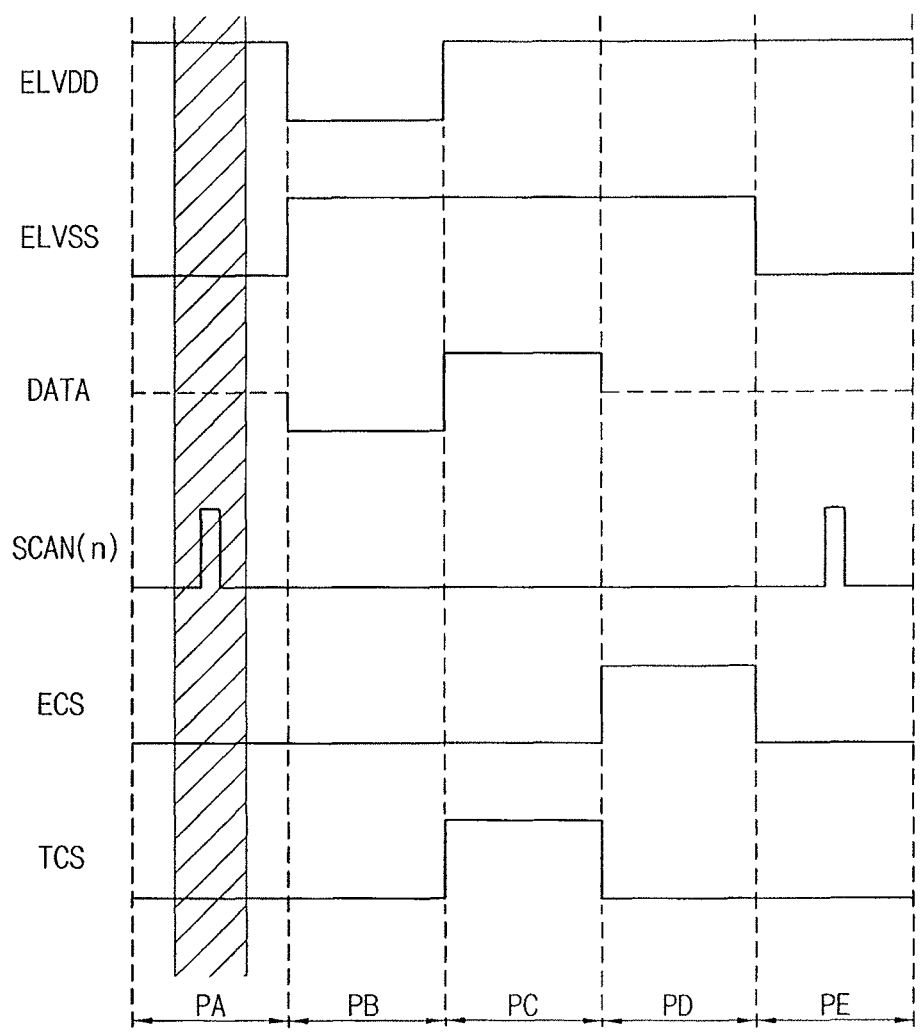
FIGS. 8A through 8E illustrate timing diagrams of an example operation of the pixel circuit of FIG. 7.

Referring to FIG. 8A, the first preliminary data writing operation FPDP may be performed in the first preliminary data writing period PA. As described above, the first preliminary data writing operation FPDP of the first display operation for displaying the first image and the second emission operation SEP of the second display operation for displaying the second image may be simultaneously performed. Thus, the second image may be displayed based on second image data stored in each pixel circuit 300 while first image data DATA is written into each pixel circuit 300 in the first preliminary data writing period PA. In detail, in the first preliminary data writing period PA, the first power voltage ELVDD may have a high voltage level, and the second power voltage ELVSS may have a logic low level. In addition, an emission control signal ECS may have a low voltage level, and a compensation control signal TCS may also have a low voltage level. Thus, the third and fourth NMOS transistors NT3 and NT4 may turn off in the pixel circuit 300 of FIG. 7. When the fourth NMOS transistor NT4 turns off, the first region FA may be separated from the second region SA in the pixel circuit 300 of FIG. 7, and an operation of the first region FA may be independent from an operation of the second region SA. As a result, in the first region FA, when the fifth NMOS transistor NT5 turns on in response to a scan signal that is applied through the scan line SL, the first image data DATA that is applied through the data line DL may be stored in the third capacitor C3. At the same time, in the second region SA, the organic light emitting diode OLED may emit light based on a current flowing from the first power voltage ELVDD having a high voltage level to the second power voltage ELVSS having a low voltage level.

As described above, in the organic light emitting display device having the pixel circuit 300 of FIG. 7, while the second image (i.e., the right image or the left image) is displayed by each pixel circuit 300, the first image data DATA (i.e., the left image data or the right image data) may be stored in the third capacitor C3 of each pixel circuit 300. Similarly, while the first image (i.e., the left image or the right image) is displayed by each pixel circuit 300, the second image data DATA (i.e., the right image data or the left image data) may be stored in the third capacitor C3 of each pixel circuit 300.

Figure 8B:
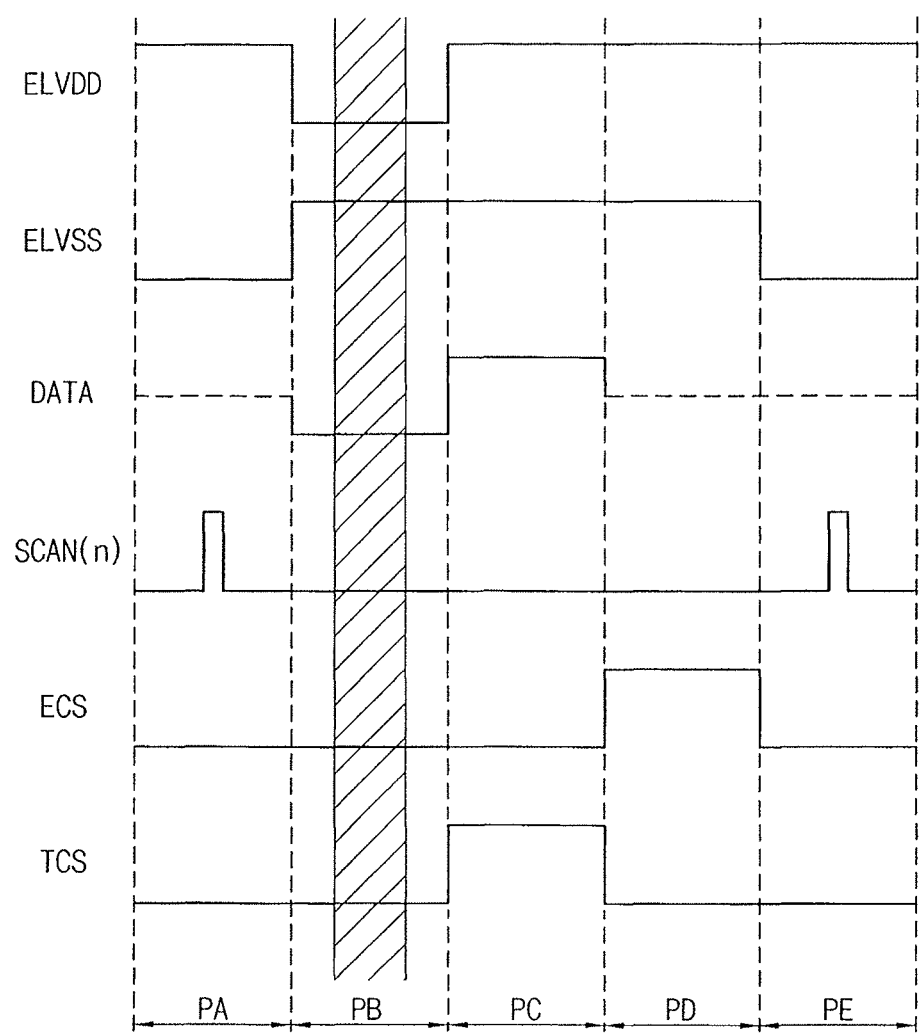

Referring to FIG. 8B, the first reset operation FIP may be performed in the first reset period PB. In detail, in the first reset period PB, the first power voltage ELVDD may have a low voltage level, and the second power voltage ELVSS may have a high voltage level. In addition, the emission control signal ECS may have a low voltage level, and the compensation control signal TCS may also have a low voltage level. Thus, the third and fourth NMOS transistors NT3 and NT4 may turn off in the pixel circuit 300 of FIG. 7. When the fourth NMOS transistor NT4 turns off, the first region FA may be separated from the second region SA in the pixel circuit 300 of FIG. 7, and an operation of the first region FA may be independent from an operation of the second region SA. Since the second power voltage ELVSS is higher than the first power voltage ELVDD, the first reset operation FIP may be performed in the second region SA.

Figure 8C:
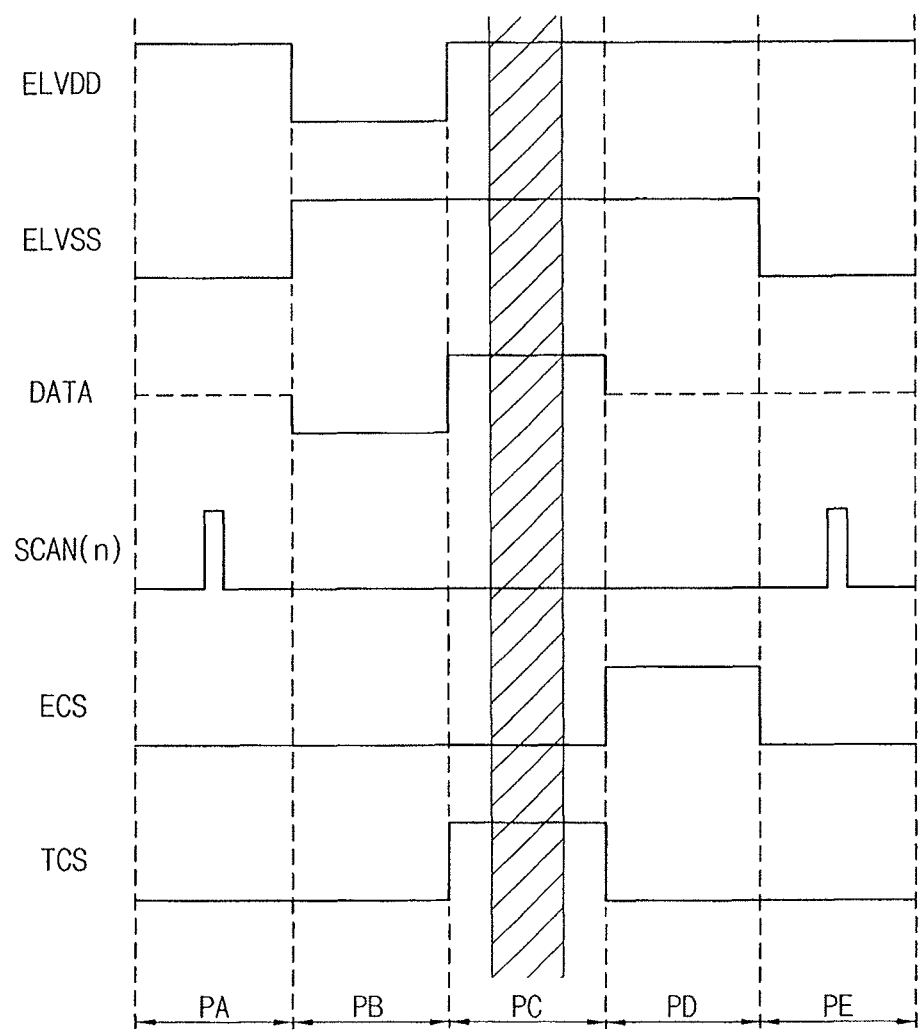

Referring to FIG. 8C, the first threshold voltage compensation operation FVP may be performed in the first threshold voltage compensation period PC. In detail, in the first threshold voltage compensation period PC, the first power voltage ELVDD may have a high voltage level, and the second power voltage ELVSS may also have a high voltage level. In addition, the emission control signal ECS may have a low voltage level, and the compensation control signal TCS may have a high voltage level. Thus, in the pixel circuit 300 of FIG. 7, the second and third NMOS transistors NT2 and NT3 may turn on, and the fourth and fifth NMOS transistors NT4 and NT5 may turn off. When the fourth NMOS transistor NT4 turns off, the first region FA may be separated from the second region SA in the pixel circuit 300 of FIG. 7, and an operation of the first region FA may be independent from an operation of the second region SA. When the second and third NMOS transistors NT2 and NT3 turn on, the first threshold voltage compensation operation FVP may be performed in the second region SA.

Figure 8D:
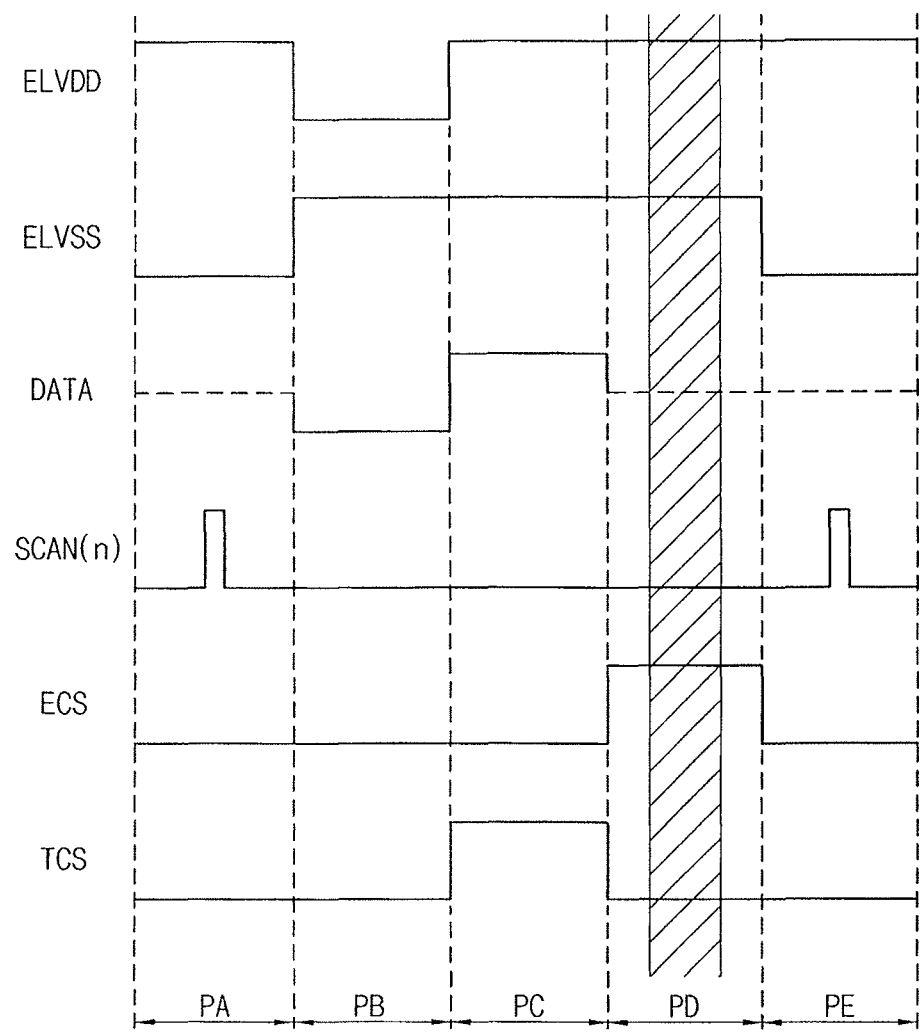

Referring to FIG. 8D, the first data writing operation FWP may be performed in the first data writing period PD. In detail, in the first data writing period PD, the first power voltage ELVDD may have a high voltage level, and the second power voltage ELVSS may also have a high voltage level. In addition, the emission control signal ECS may have a high voltage level, and the compensation control signal TCS may have a low voltage level. Thus, in the pixel circuit 300 of FIG. 7, the fourth and fifth NMOS transistors NT4 and NT5 may turn on, and the second and third NMOS transistors NT2 and NT3 may turn off. When the fourth NMOS transistor NT4 turns on, the first region FA may be coupled to the second region SA in the pixel circuit 300 of FIG. 7. When the first region FA is coupled to the second region SA, the first image data DATA that is stored in the third capacitor C3 by the first preliminary data writing operation FPDP may be transferred to the second region SA. As a result, a voltage of a gate terminal (i.e., the first node N1) of the first NMOS transistor NT1 may be changed by the first image data DATA.

Figure 8E:
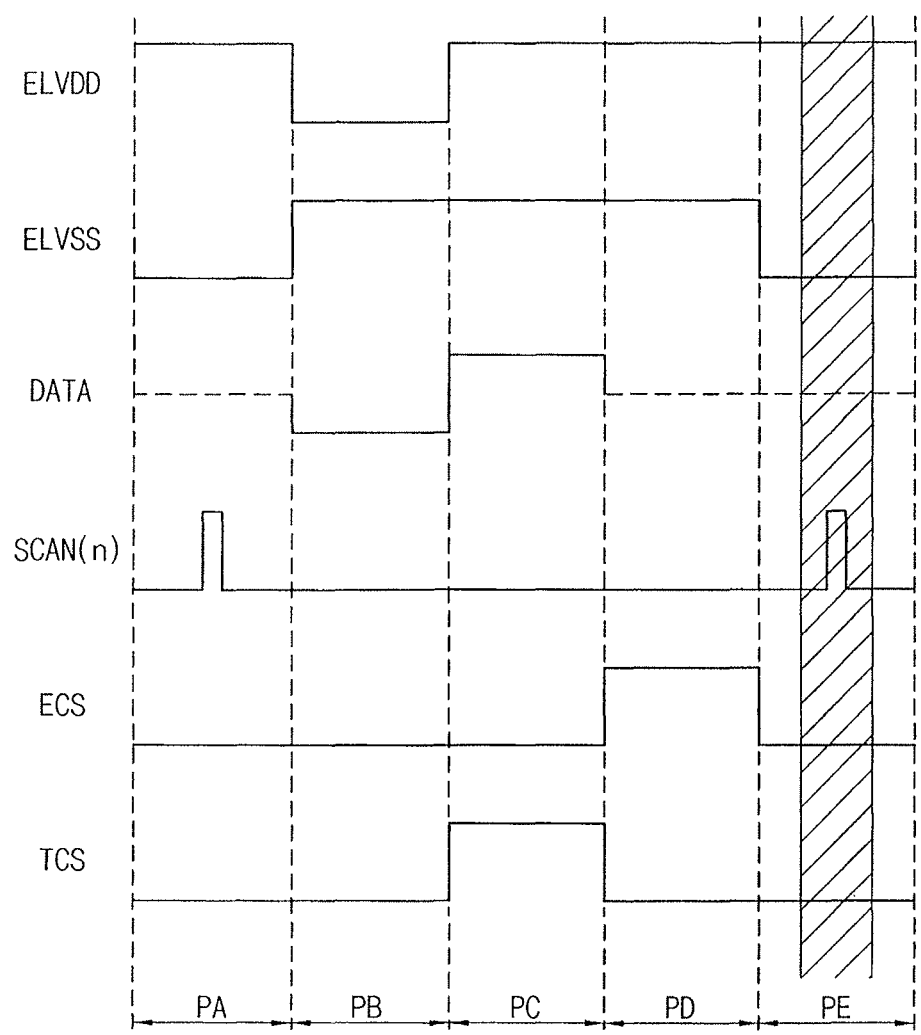

Referring to FIG. 8E, the first emission operation FEP may be performed in the first emission period PE. In detail, in the first emission period PE, the first power voltage ELVDD may have a high voltage level, and the second power voltage ELVSS may have a low voltage level. In addition, the emission control signal ECS may have a low voltage level, and the compensation control signal TCS may also have a low voltage level. Thus, the third and fourth NMOS transistors NT3 and NT4 may turn off in the pixel circuit 300 of FIG. 7. When the fourth NMOS transistor NT4 turns off, the first region FA may be separated from the second region SA in the pixel circuit 300 of FIG. 7, and an operation of the first region FA may be independent from an operation of the second region SA. Similar to FIG. 8A, the second preliminary data writing operation SPDP of the second display operation and the first emission operation FEP of the first display operation may be simultaneously performed. Thus, the second image data may be written into each pixel circuit 300 while the first image is displayed based on the first image data DATA stored in each pixel circuit 300. As a result, in the first region FA, when the fifth NMOS transistor NT5 turns on in response to a scan signal applied through the scan line SL, the second image data applied through the data line DL may be stored in the third capacitor C3. At the same time, in the second region SA, the organic light emitting diode OLED may emit light based on a current flowing from the first power voltage ELVDD having a high voltage level to the second power voltage ELVSS having a low voltage level.

Although the first display operation for displaying the first image (i.e., the first preliminary data writing period PA, the first reset period PB, the first threshold voltage compensation period PC, the first data writing period PD, and the first emission period PE) and the second display operation for displaying the second image (i.e., the second preliminary data writing period PA, the second reset period PB, the second threshold voltage compensation period PC, the second data writing period PD, and the second emission period PE) are described with reference to FIGS. 8A through 8E, it should be understood that the driving signal waveforms illustrated in FIGS. 8A through 8E are simplified for convenience of description. Thus, the pixel circuit 300 of FIG. 7 may operate based on more complicated driving signal waveforms.

Figure 9:
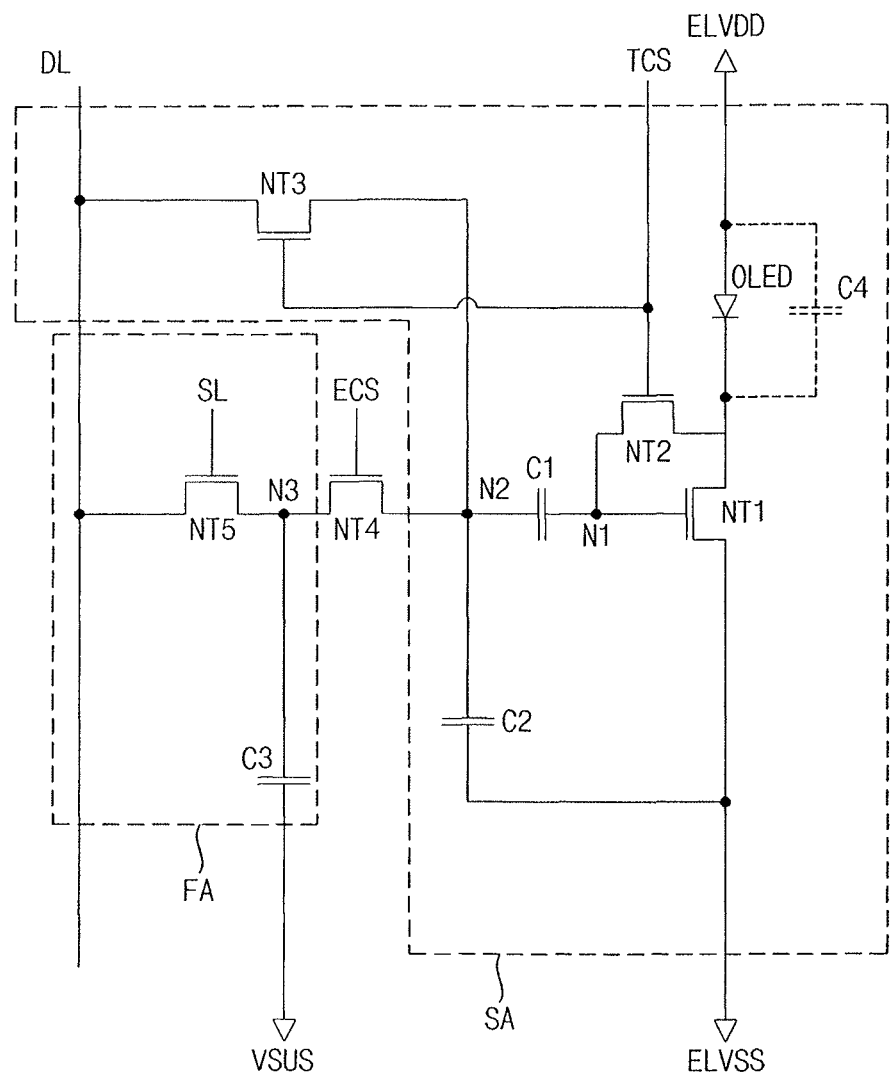
FIG. 9 illustrates a circuit diagram of a pixel circuit according to example embodiments.

FIG. 9 illustrates a circuit diagram of a pixel circuit 400 according to example embodiments.

Referring to FIG. 9, the pixel circuit 400 may include an organic light emitting diode OLED, first through fifth NMOS transistors NT1 through NT5, and first through third capacitors C1 through C3. The pixel circuit 400 may have a 5T-3C structure (i.e., a structure having five transistors and three capacitors). In an example embodiment, the pixel circuit 400 may further include a fourth capacitor C4 coupled between an anode electrode and a cathode electrode of the organic light emitting diode OLED.

The organic light emitting diode OLED may be coupled between a first power voltage ELVDD and the first NMOS transistor NT1. In detail, an anode electrode of the organic light emitting diode OLED may be coupled to the first power voltage ELVDD, and a cathode electrode of the organic light emitting diode OLED may be coupled to a first terminal of the first NMOS transistor NT1. The organic light emitting diode OLED may emit light based on a current that is controlled by the first NMOS transistor NT1. The first NMOS transistor NT1 may be coupled between a second power voltage ELVSS and the cathode electrode of the organic light emitting diode OLED. A gate terminal of the first NMOS transistor NT1 may be coupled to a first node N1. The first NMOS transistor NT1 may be a driving transistor that controls a current flowing through the organic light emitting diode OLED. As illustrated in FIG. 9, the first node N1 is a node at which a first terminal of the first capacitor C1, a first terminal of the second NMOS transistor NT2, and the gate terminal of the first NMOS transistor NT1 are coupled to each other. The second NMOS transistor NT2 may be coupled between the first node N1 and the cathode electrode of the organic light emitting diode OLED. A gate terminal of the second NMOS transistor NT2 may receive a compensation control signal TCS. In detail, the first terminal of the second NMOS transistor NT2 may be coupled to the first node N1, and a second terminal of the second NMOS transistor NT2 may be coupled to the first terminal of the first NMOS transistor NT1. Thus, when the second NMOS transistor NT2 turns on in response to the compensation control signal TCS, the first NMOS transistor NT1 may be diode-coupled.

The first capacitor C1 may be coupled between the first node N1 and a second node N2. In detail, the first terminal of the first capacitor C1 may be coupled to the first node N1, and a second terminal of the first capacitor C1 may be coupled to the second node N2. The first capacitor C1 may be a threshold voltage compensation capacitor. As illustrated in FIG. 9, the second node N2 is a node at which the second terminal of the first capacitor C1, a first terminal of the second capacitor C2, a first terminal of the third NMOS transistor NT3, and a first terminal of the fourth NMOS transistor NT4 are coupled to each other. The second capacitor C2 may be coupled between the second power voltage ELVSS and the second node N2. The second capacitor C2 may be a storage capacitor. In detail, the first terminal of the second capacitor C2 may be coupled to the second node N2, and a second terminal of the second capacitor C2 may be coupled to the second power voltage ELVSS. The third NMOS transistor NT3 may be coupled between a data line DL and the second node N2. A gate terminal of the third NMOS transistor NT3 may receive the compensation control signal TCS. In detail, the first terminal of the third NMOS transistor NT3 may be coupled to the second node N2, a second terminal of the third NMOS transistor NT3 may be coupled to the data line DL, and the gate terminal of the third NMOS transistor NT3 may be coupled to the gate terminal of the second NMOS transistor NT2. The fourth NMOS transistor NT4 may be coupled between a third node N3 and the second node N2. A gate terminal of the fourth NMOS transistor NT4 may receive an emission control signal ECS. In detail, the first terminal of the fourth NMOS transistor NT4 may be coupled to the second node N2, and a second terminal of the fourth NMOS transistor NT4 may be coupled to the third node N3. As illustrated in FIG. 9, the third node N3 is a node at which the second terminal of the fourth NMOS transistor NT4, a first terminal of the fifth NMOS transistor NT5, and a first terminal of the third capacitor C3 are coupled to each other.

The third capacitor C3 may be coupled between the third node N3 and a sustain power voltage VSUS. In detail, the first terminal of the third capacitor C3 may be coupled to the third node N3, and a second terminal of the third capacitor C3 may be coupled to the sustain power voltage VSUS. In FIG. 9, since the sustain power voltage VSUS is applied to the third capacitor C3, a fluctuation of a data signal (e.g., left image data or right image data) stored in the third capacitor C3 may be prevented. That is, the sustain power voltage VSUS may be a predetermined DC voltage to prevent the fluctuation of the data signal stored in the third capacitor C3. The fifth NMOS transistor NT5 may be coupled between the data line DL and the third node N3. A gate terminal of the fifth NMOS transistor NT5 may be coupled to a scan line SL. In detail, the first terminal of the fifth NMOS transistor NT5 may be coupled to the third node N3, a second terminal of the fifth NMOS transistor NT5 may be coupled to the data line DL, and the gate terminal of the fifth NMOS transistor NT5 may be coupled to the scan line SL. The data line DL may be coupled to a data driving unit of an organic light emitting display device to provide a data signal (e.g., left image data or right image data). In addition, the scan line SL may be coupled to a scan driving unit of the organic light emitting display device to provide a scan signal.

As described above, the pixel circuit 400 may have a 5T-3C structure that includes the organic light emitting diode OLED, the first through fifth NMOS transistors NT1 through NT5, and the first through third capacitors C1 through C3. An organic light emitting display device having the pixel circuit 400 may implement a stereoscopic image by alternately displaying a left image and a right image based on a simultaneous emission method. For example, the right image data may be sequentially written into each pixel circuit 400 of the organic light emitting display device while the left image is simultaneously displayed by each pixel circuit 400 of the organic light emitting display device. Similarly, the left image data may be sequentially written into each pixel circuit 400 of the organic light emitting display device while the right image is simultaneously displayed by each pixel circuit 400 of the organic light emitting display device.

As illustrated in FIG. 9, the pixel circuit 400 may include a first region FA and a second region SA. In the following description, the first region FA includes the third capacitor C3 and the fifth NMOS transistor NT5, and the second region SA includes the first and second capacitors C1 and C2 and the first through fourth NMOS transistors NT1 through NT4. When the fourth NMOS transistor NT4 turns on, the first region FA may be coupled to the second region SA. When the fourth NMOS transistor NT4 turns off, the first region FA may be separated from the second region SA. In detail, when the fourth NMOS transistor NT4 turns on, the first region FA may be coupled to the second region SA in the pixel circuit 400. As a result, a data signal (e.g., the left image data or the right image data) stored in the third capacitor C3 may be transferred to the second region SA. On the other hand, when the fourth NMOS transistor NT4 turns off, the first region FA may be separated from the second region SA in the pixel circuit 400. As a result, the first region FA and the second region SA may perform respective operations. In detail, an emission operation may be performed in the second region SA while a preliminary data writing operation is performed in the first region FA. Thus, an operation of the first region FA may be independent from an operation of the second region SA. For example, when the fourth NMOS transistor NT4 turns off in response to the emission control signal ECS, the first image (e.g., the left image or the right image) may be displayed by the first and second NMOS transistors NT1 and NT2, the first and second capacitors C1 and C2, and the organic light emitting diode OLED (i.e., an operation of the second region SA). At the same time, the second image data (e.g., the right image data or the left image data) input through the data line DL may be stored in the third capacitor C3 when the fifth NMOS transistor NT5 turns on in response to a scan signal input through the scan line SL (i.e., an operation of the first region FA).

Figure 10:
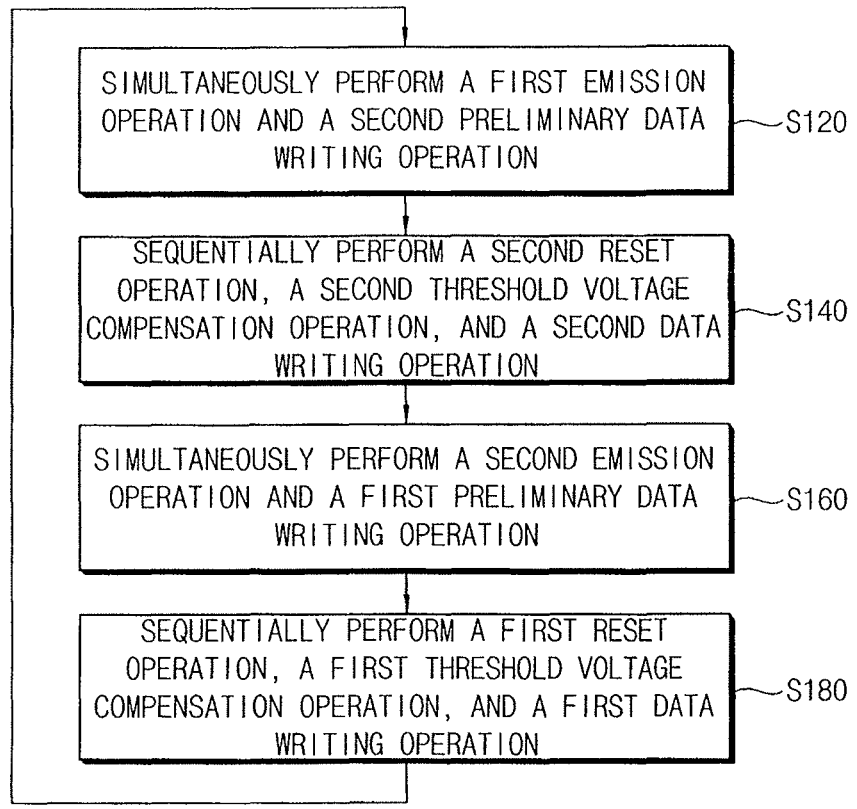
FIG. 10 illustrates a flow chart of a method of driving a pixel circuit according to example embodiments.
Figure 11:
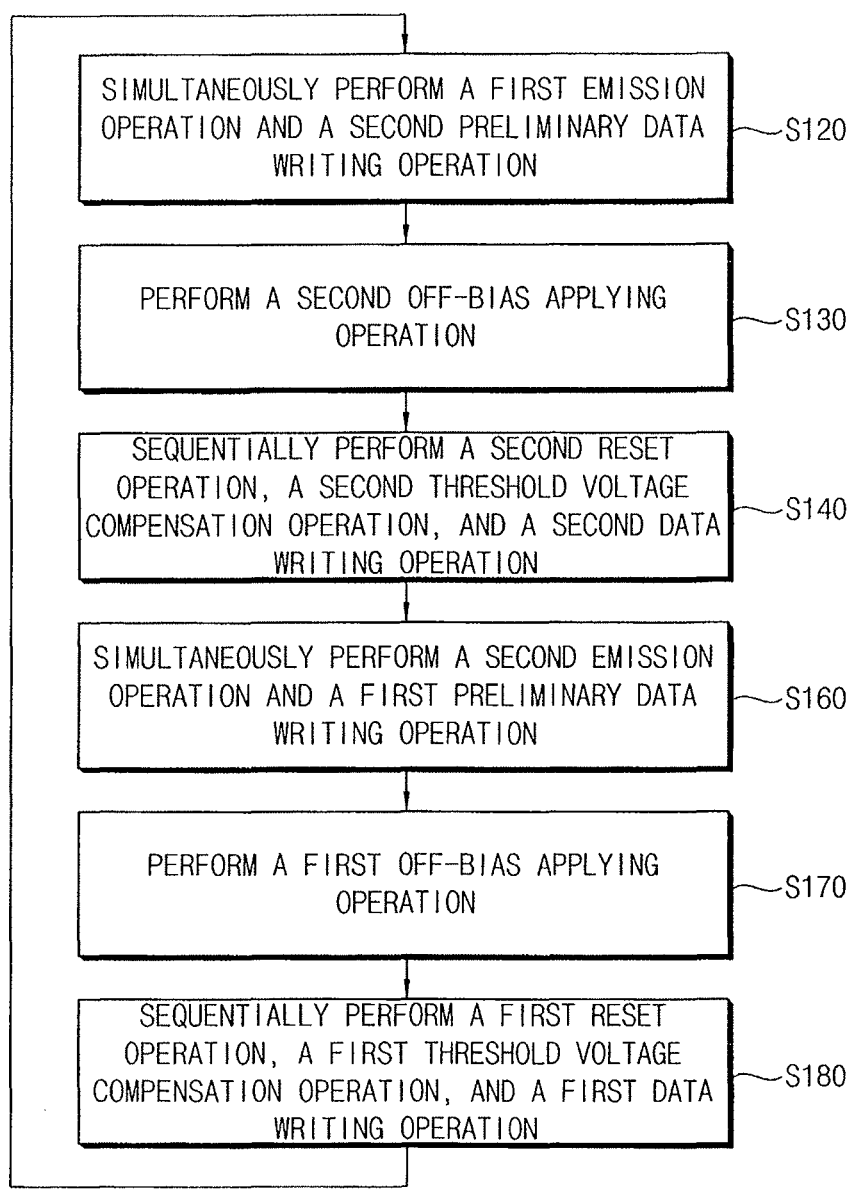
FIG. 11 illustrates a flow chart of a method of driving a pixel circuit according to example embodiments.

FIGS. 10 and 11 illustrate flow charts of a method of driving a pixel circuit according to example embodiments.

Referring to FIGS. 10 and 11, the method of FIG. 10 and the method of FIG. 11 may alternatively perform a first display operation for displaying a left image and a second display operation for displaying a right image. The first and second display operations may be performed based on a simultaneous emission method.

According to the method of FIG. 10, a first emission operation of the first display operation and a second preliminary data writing operation of the second display operation may be simultaneously performed (operation S120). After the first emission operation is completed, a second reset operation, a second threshold voltage compensation operation, and a second data writing operation of the second display operation may be sequentially performed (operation S140). Next, a second emission operation of the second display operation and a first preliminary data writing operation of the first display operation may be simultaneously performed (operation S160). After the second emission operation is completed, a first reset operation, a first threshold voltage compensation operation, and a first data writing operation of the first display operation may be sequentially performed (operation S180).

According to the method of FIG. 11, a second off-bias applying operation may be performed (operation S130) prior to the second reset operation of the second display operation, and a first off-bias applying operation may be performed (operation S170) prior to the first reset operation of the first display operation. For these operations, a pixel circuit according to example embodiments may have a 5T-3C structure that includes an organic light emitting diode, first through fifth PMOS transistors, and first through third capacitors. In another implementation, a pixel circuit according to example embodiments may have a 5T-3C structure that includes an organic light emitting diode, first through fifth NMOS transistors, and first through third capacitors. The pixel circuit may be a circuit as described with reference to FIGS. 1, 6, 7, and 9.

Figure 12:
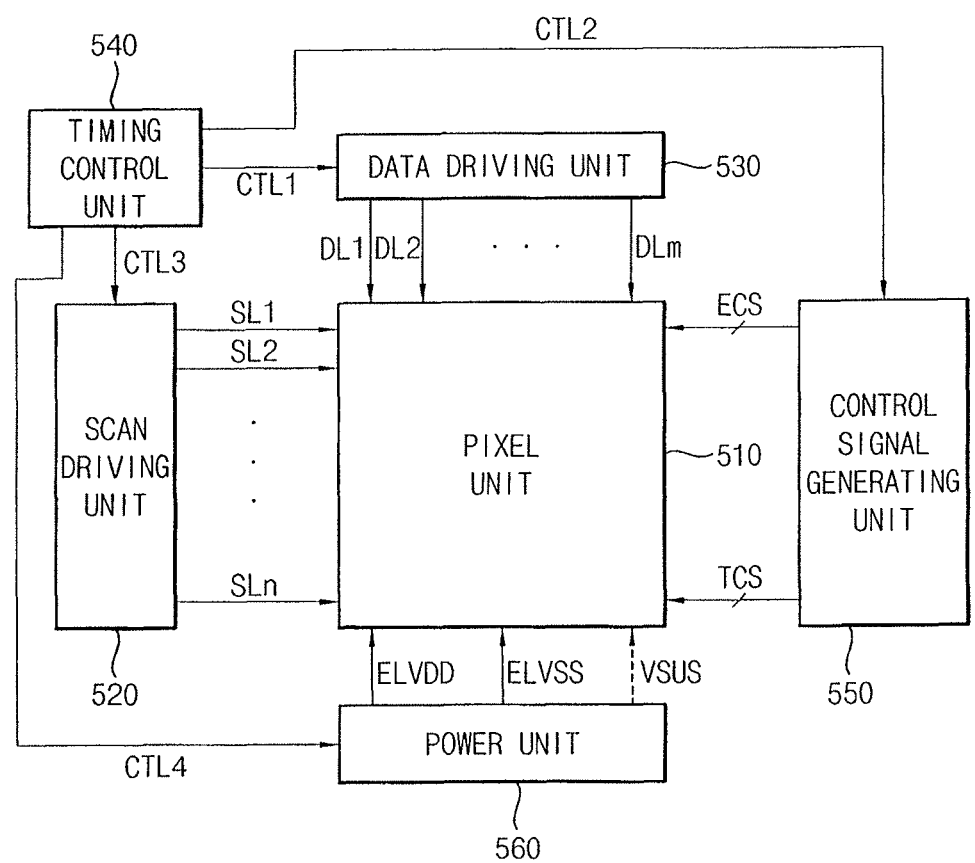
FIG. 12 illustrates a block diagram of an organic light emitting display device according to example embodiments.

FIG. 12 illustrates a block diagram of an organic light emitting display device according to example embodiments.

Referring to FIG. 12, the organic light emitting display device 500 may include a pixel unit 510, a scan driving unit 520, a data driving unit 530, a timing control unit 540, a control signal generating unit 550, and a power unit 560. In some example embodiments, the scan driving unit 520, the data driving unit 530, the timing control unit 540, the control signal generating unit 550, and the power unit 560 may be implemented by one integrated circuit (IC).

The pixel unit 510 may be coupled to the scan driving unit 520 via a plurality of scan lines SL1 through SLn, may be coupled to the data driving unit 530 via a plurality of data lines DL1 through DLm, and may be coupled to the control signal generating unit 550 via a plurality of control lines. The pixel unit 510 may receive a first power voltage ELVDD and a second power voltage ELVSS from the power unit 560. In an example embodiment, the pixel unit 510 may further receive a sustain power voltage VSUS from the power unit 560. The pixel unit 510 may includes a plurality of pixel circuits. Each pixel circuit may be coupled to one scan line that provides a scan signal, may be coupled to one data line that provides a data signal (e.g., left image data or right image data), and may be coupled to the control lines that provide an emission control signal ECS and a compensation control signal TCS. In addition, each pixel circuit may receive the first power voltage ELVDD and the second power voltage ELVSS. In an example embodiment, each pixel circuit may further receive the sustain power voltage VSUS.

The pixel circuits may be located at crossing points of the scan lines SL1 through SLn and the data lines DL1 through DLm. Thus, the pixel unit 510 may include n*m pixel circuits (i.e., the number of pixel circuits is n*m). The timing control unit 540 may control the scan driving unit 520, the data driving unit 530, the control signal generating unit 550, and the power unit 560 by generating and providing a plurality of timing control signals CTL1, CTL2, CTL3, and CTL4 to the scan driving unit 520, the data driving unit 530, the control signal generating unit 550, and the power unit 560.

As described above, each pixel circuit may operate based on the first power voltage ELVDD, the second power voltage ELVSS, the scan signal, the data signal, the emission control signal ECS, the compensation control signal TCS, and/or the sustain power voltage VSUS. In an example embodiment, each pixel circuit may include an organic light emitting diode, first through fifth PMOS transistors, and first through third capacitors. In another example embodiment, each pixel circuit may include an organic light emitting diode, first through fifth NMOS transistors, and first through third capacitors. Each pixel circuit may have a 5T-3C structure (i.e., a structure having five transistors and three capacitors).

Each pixel circuit may store the right image data while an emission operation of a left image is performed, and may store the left image data while an emission operation of a right image is performed. The organic light emitting display device 500 may implement a stereoscopic image by alternately performing a first display operation for displaying a first image (e.g., the left image) and a second display operation for displaying a second image (e.g., the right image). The first display operation may include a first preliminary data writing operation, a first reset operation, a first threshold voltage compensation operation, a first data writing operation, and a first emission operation. The second display operation may include a second preliminary data writing operation, a second reset operation, a second threshold voltage compensation operation, a second data writing operation, and a second emission operation. When the first display operation and the second display operation are alternately performed, the first emission operation of the first display operation and the second preliminary data writing operation of the second display operation are simultaneously performed, and the second emission operation of the second display operation and the first preliminary data writing operation of the first display operation are simultaneously performed.

The preliminary data writing operation (i.e., the first preliminary data writing operation or the second preliminary data writing operation) may be sequentially performed for all pixel circuits of the organic light emitting display device 500 by each scan line SL1 through SLn. On the other hand, the reset operation (i.e., the first reset operation or the second reset operation), the threshold voltage compensation operation (i.e., the first threshold voltage compensation operation or the second threshold voltage compensation operation), the data writing operation (i.e., the first data writing operation or the second data writing operation), or the emission operation (i.e., the first emission operation or the second emission operation) may be simultaneously performed for all pixel circuits of the organic light emitting display device 500. As described above, in the organic light emitting display device 500, the first image data (i.e., the left image data or the right image data) may be sequentially written into each pixel circuit of the organic light emitting display device 500 while the second image (i.e., the right image or the left image) is simultaneously displayed by each pixel circuit of the organic light emitting display device 500. Similarly, the second image data (i.e., the right image data or the left image data) may be sequentially written into each pixel circuit of the organic light emitting display device 500 while the first image (i.e., the left image or the right image) is simultaneously displayed by each pixel circuit of the organic light emitting display device 500. As a result, the organic light emitting display device 500 employing a simultaneous emission method may operate at a high speed, may reduce power consumption, and may improve luminance.

Figure 13:
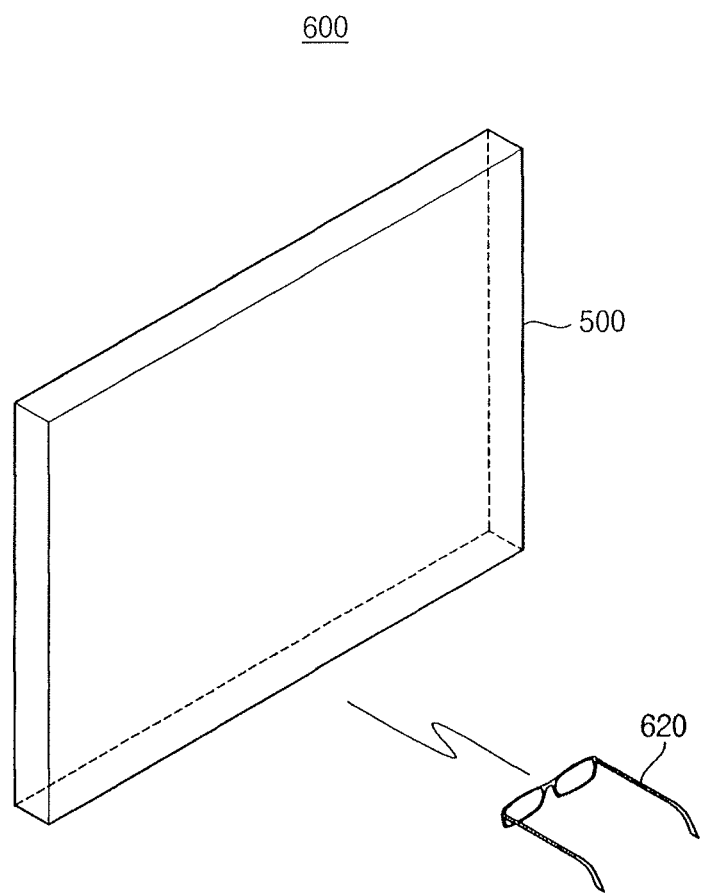
FIG. 13 illustrates a diagram of a stereoscopic image display system employing a shutter glasses method, which includes an organic light emitting display device of FIG. 12.

FIG. 13 illustrates a diagram of a stereoscopic image display system 600 employing a shutter glasses method, which includes an organic light emitting display device of FIG. 12.

Referring to FIG. 13, the stereoscopic image display system 600 may include an organic light emitting display device 500 and shutter glasses 620.

The organic light emitting display device 500 may implement a stereoscopic image by alternately displaying a left image (i.e., a left image frame) and a right image (i.e., a right image frame). In some example embodiments, the organic light emitting display device 500 may generate a synchronization signal for alternately providing the left image and the right image to a left eye and a right eye, respectively. Thus, the left image and the right image may be synchronized with the synchronization signal. The shutter glasses 620 may open/close a left shutter and a right shutter in synchronization with the left image and the right image, respectively when the organic light emitting display device 500 alternately displays the left image and the right image. For example, the shutter glasses 620 may open the left shutter based on the synchronization signal when the organic light emitting display device 500 displays the left image, and may open the right shutter based on the synchronization signal when the organic light emitting display device 500 displays the right image. In some example embodiments, the organic light emitting display device 500 may provide the shutter glasses 620 with the synchronization signal using various wired/wireless methods.

Each pixel circuit of the organic light emitting display device 500 may have, as described above, a 5T-3C structure that includes an organic light emitting diode, first through fifth PMOS transistors, and first through third capacitors. In another implementation, each pixel circuit of the organic light emitting display device 500 may have, as described above, a 5T-3C structure that includes an organic light emitting diode, first through fifth NMOS transistors, and first through third capacitors. Each pixel circuit of the organic light emitting display device 500 may store the right image data while an emission operation of the left image is performed, and may store the left image data while an emission operation of the right image is performed. Therefore, the organic light emitting display device 500 may operate at a high speed, may reduce power consumption, and may improve luminance.

Figure 14:
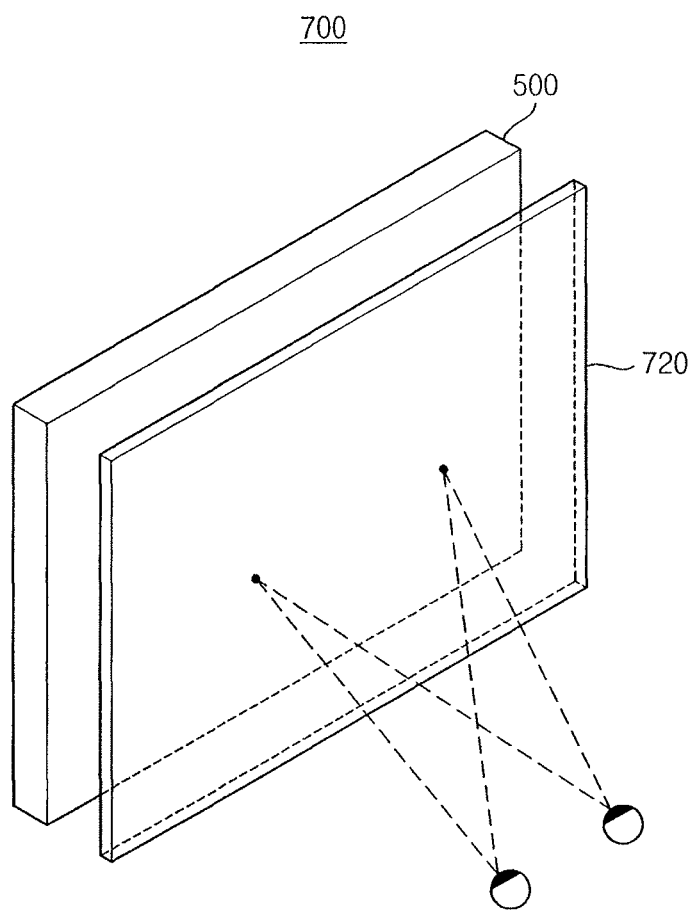
FIG. 14 illustrates a diagram of a stereoscopic image display system employing a parallax barrier method, which includes an organic light emitting display device of FIG. 12.

FIG. 14 illustrates a diagram of a stereoscopic image display system 700 employing a parallax barrier method, which includes an organic light emitting display device of FIG. 12.

Referring to FIG. 14, the stereoscopic image display system 700 may include an organic light emitting display device 500 and a parallax barrier 720.

The organic light emitting display device 500 may implement a stereoscopic image by alternately displaying a left image (i.e., a left image frame) and a right image (i.e., a right image frame). In some example embodiments, the organic light emitting display device 500 may generate a synchronization signal for alternately providing the left image and the right image to a left eye and a right eye, respectively. Thus, the left image and the right image may be synchronized with the synchronization signal. When the organic light emitting display device 500 alternately displays the left image and the right image, the parallax barrier 720 may allow the left image and the right image to alternatively pass through. In detail, the parallax barrier 720 may alternately provide the left image and the right image to the left eye and the right eye by changing positions of opening areas and blocking areas of the parallax barrier 720.

As described above, each pixel circuit of the organic light emitting display device 500 may have a 5T-3C structure that includes an organic light emitting diode, first through fifth PMOS transistors, and first through third capacitors, or may have a 5T-3C structure that includes an organic light emitting diode, first through fifth NMOS transistors, and first through third capacitors. On this basis, each pixel circuit of the organic light emitting display device 500 may store the right image data while an emission operation of the left image is performed, and may store the left image data while an emission operation of the right image is performed. Therefore, the organic light emitting display device 500 may operate at a high speed, and may reduce power consumption (i.e., may improve luminance).

Figure 15:
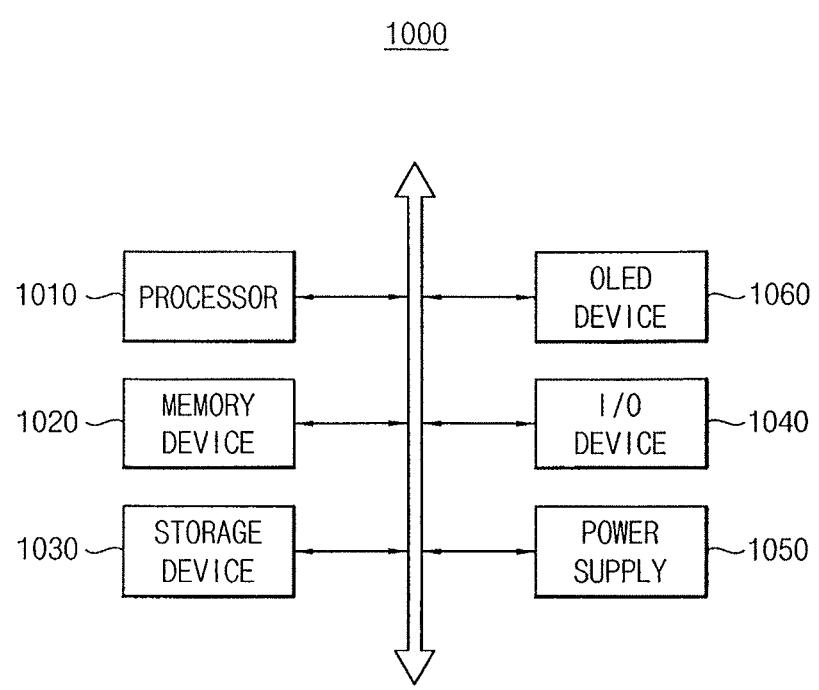
FIG. 15 illustrates a block diagram of an electric device having an organic light emitting display device of FIG. 12.

FIG. 15 illustrates a block diagram of an electric device 1000 having an organic light emitting display device of FIG. 12.

Referring to FIG. 15, the electric device 1000 may include a processor 1010, a memory device 1020, a storage device 1030, an input/output (I/O) device 1040, a power supply 1050, and an organic light emitting display device 1060. The organic light emitting display device 1060 may correspond to the organic light emitting display device 500 of FIG. 12. In addition, the electric device 1000 may further include a plurality of ports for communicating a video card, a sound card, a memory card, a universal serial bus (USB) device, other electric devices, etc.

The processor 1010 may perform various computing functions. The processor 1010 may be a microprocessor, a central processing unit (CPU), etc. The processor 1010 may be coupled to other components via an address bus, a control bus, a data bus, etc. Further, the processor 1010 may be coupled to an extended bus such as a peripheral component interconnection (PCI) bus. The memory device 1020 may store data for operations of the electric device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile dynamic random access memory (mobile DRAM) device, etc. The storage device 1030 may be a solid state drive device, a hard disk drive device, a CD-ROM device, etc.

The I/O device 1040 may be an input device such as a keyboard, a keypad, a mouse, a touch screen, etc, and/or an output device such as a printer, a speaker, etc. In some example embodiments, the organic light emitting display device 1060 may be included as the output device in the I/O device 1040. The power supply 1050 may provide a power for operations of the electric device 1000. The organic light emitting display device 1060 may communicate with other components via the buses or other communication links.

The organic light emitting display device 1060 may, as described above, implement a stereoscopic image by alternately providing a left image (i.e., a left image frame) and a right image (i.e., a right image frame) to a left eye and a right eye, respectively. Each pixel circuit of the organic light emitting display device 1060 may have a 5T-3C structure that includes an organic light emitting diode, first through fifth PMOS transistors, and first through third capacitors. In another implementation each pixel circuit of the organic light emitting display device 1060 may have a 5T-3C structure that includes an organic light emitting diode, first through fifth NMOS transistors, and first through third capacitors. Each pixel circuit of the organic light emitting display device 1060 may store the right image data while an emission operation of the left image is performed, and may store the left image data while an emission operation of the right image is performed. Therefore, the organic light emitting display device 1060 may operate at a high speed, may reduce power consumption, and may improve luminance. The organic light emitting display device 1060 may be as described above. The organic light emitting display device 1060 may be applied to a suitable system having a stereoscopic image display device such as a stereoscopic image display system employing a shutter glasses method, a stereoscopic image display system employing a parallax barrier method, etc.

Embodiments may be applied to an electric device having an organic light emitting display device. For example, embodiments may be applied to a television, a computer monitor, a laptop, a digital camera, a cellular phone, a smart phone, a personal digital assistant (PDA), a portable multimedia player (PMP), an MP3 player, a navigation system, a video phone, etc.

By way of summation and review, a method of implementing a stereoscopic image using an organic light emitting display device may include alternately displaying a left image and a right image on the organic light emitting display device. The left image and the right image may be provided to a left eye and a right eye, respectively.

A general organic light emitting display device employing a sequential emission method may exhibit low luminance and high power consumption when implementing a stereoscopic image because of the manner in which the general organic light emitting display device inserts a black image (i.e., a black image frame) between a left image (i.e., a left image frame) and a right image (i.e., a right image frame) when alternately displaying the left image and the right image, so as to separate the right image from the left image. For example, in case that a stereoscopic image of 60 Hz is implemented, a left image of 60 Hz, a black image of 60 Hz, a right image of 60 Hz, and a black image of 60 Hz may be sequentially displayed, such that a fast operating speed of 240 Hz (i.e., 60 Hz+60 Hz+60 Hz+60 Hz) is employed for the general organic light emitting display device. In addition, an emission time may be reduced by half, and a luminance may be reduced by half, when the black image is inserted between the left image and the right image in the above manner. Further, high power may be consumed to obtain the same luminance compared to a case without an insertion of the black image.

As described above, example embodiments relate generally to a stereoscopic (3D) image display technique. Some example embodiments provide a pixel circuit that, when an organic light emitting display device including the pixel circuit implements a stereoscopic image based on a simultaneous emission method, may store right image data while a left image is displayed in an emission period of the left image, and store left image data while a right image is displayed in an emission period of the right image. The pixel circuit according to embodiments may operate at a high speed, and may reduce power consumption and/or improve luminance based on a same power consumption.

Some example embodiments provide a method of driving a pixel circuit so as to write right image data into the pixel circuit while a left image is displayed in an emission period of the left image, and write left image data into the pixel circuit while a right image is displayed in an emission period of the right image when an organic light emitting display device including the pixel circuit implements a stereoscopic image based on a simultaneous emission method.

Some example embodiments provide an organic light emitting display device having the pixel circuit. An organic light emitting display device according to example embodiments may operate at a high speed, and may reduce power consumption when the organic light emitting display device implements a stereoscopic image based on a simultaneous emission method.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of driving a pixel circuit, comprising:
simultaneously performing a first emission operation of a first display operation for displaying a left image based on a first data value stored in a first capacitor and a second preliminary data writing operation storing a second data value in a second capacitor of a second display operation for displaying a right image;
sequentially performing a second reset operation, a second threshold voltage compensation operation, and a second data writing operation of the second display operation after the first emission operation is completed, the second data writing operation including transferring the second data value stored in the second capacitor for storage in the first capacitor;
simultaneously performing a second emission operation of the second display operation based on the second data value stored in the first capacitor and a first preliminary data writing operation to store a third data value in the second capacitor of the first display operation; and
sequentially performing a first reset operation, a first threshold voltage compensation operation, and a first data writing operation of the first display operation after the second emission operation is completed, the fist data writing operation including transferring the third data value stored in the second capacitor for storage in the first capacitor.

2. The method as claimed in claim 1, further comprising:
performing a first off-bias applying operation of the first display operation prior to the first reset operation of the first display operation; and
performing a second off-bias applying operation of the second display operation prior to the second reset operation of the second display operation.

3. The method as claimed in claim 1, wherein the second capacitor is coupled between a second node and a gate of a transistor that is coupled between a data line and a first node that is coupled between the first and second capacitors, and wherein the second node is coupled between the data line and the first node.

4. The method as claimed in claim 1, wherein the second capacitor is coupled between a sustain power voltage and a second node that is coupled between a data line and a first node that is coupled between the first and second capacitors.

* * * * *